US010403175B2

(12) United States Patent
Dashe et al.

(10) Patent No.: US 10,403,175 B2
(45) Date of Patent: Sep. 3, 2019

(54) MULTI-PANEL DISPLAY KIT

(71) Applicant: ArtSkills, Inc., Bethlehem, PA (US)

(72) Inventors: Stephen P. Dashe, Bethlehem, PA (US); Bradford Demsky, Hampton, NJ (US)

(73) Assignee: ARTSKILLS, INC.

( * ) Notice: Subject to any disclaimer, the term of this patent is extended or adjusted under 35 U.S.C. 154(b) by 0 days.

(21) Appl. No.: 15/948,257

(22) Filed: Apr. 9, 2018

(65) Prior Publication Data

US 2018/0225995 A1  Aug. 9, 2018

Related U.S. Application Data

(63) Continuation-in-part of application No. 15/680,307, filed on Aug. 18, 2017, now abandoned, which is a continuation of application No. 15/294,953, filed on Oct. 17, 2016, now Pat. No. 9,741,266, which is a continuation of application No. 14/754,802, filed on Jun. 30, 2015, now Pat. No. 9,495,886, which is a
(Continued)

(51) Int. Cl.
| | |
|---|---|
| *G09F 1/06* | (2006.01) |
| *G09B 29/04* | (2006.01) |
| *G09B 29/00* | (2006.01) |
| *B65D 1/22* | (2006.01) |
| *G09F 15/00* | (2006.01) |

(52) U.S. Cl.
CPC ............... *G09F 1/06* (2013.01); *B65D 1/22* (2013.01); *G09B 29/001* (2013.01); *G09B 29/04* (2013.01); *G09F 15/0006* (2013.01)

(58) Field of Classification Search
CPC ....... G09F 1/06; G09F 15/0062; G09B 29/001; G09B 29/04
See application file for complete search history.

(56) References Cited

U.S. PATENT DOCUMENTS

| 1,486,695 A | 3/1924 | Singer et al. |
| 1,958,755 A | 5/1934 | Ihling |
| | (Continued) | |

FOREIGN PATENT DOCUMENTS

| JP | 2011104037 | 6/2011 |
| JP | 2013091519 | 5/2013 |

OTHER PUBLICATIONS

Elmer's Foam & Display Boards, http://www.elmers.com/product/detail/905142 (website) Mini Bi-Fold Foam Board, Product Description. 2017. US.

*Primary Examiner* — Cassandra Davis
(74) *Attorney, Agent, or Firm* — Belles Katz LLC

(57) ABSTRACT

A multi-panel display kit that includes a multi-panel display device and a header panel. The multi-panel display device may have a center panel, a first side panel attached to the center panel on a first side thereof, and a second side panel attached to the center panel on a second side thereof, the second side of the center panel being opposite the first side of the center panel. The first and second side panels may have a combined width that is less than a width of the center panel. The header panel may have a height that is substantially equal to the difference between the width of the center panel and the sum of the widths of the first and second side panels. Thus, in a folded state, the header panel may fit within a gap between the first and second side panels.

18 Claims, 16 Drawing Sheets

Related U.S. Application Data continuation of application No. 14/614,742, filed on Feb. 5, 2015, now Pat. No. 9,076,352, which is a continuation of application No. 14/573,044, filed on Dec. 17, 2014, now abandoned, which is a continuation of application No. 13/769,706, filed on Feb. 18, 2013, now Pat. No. 8,955,243, which is a continuation-in-part of application No. 29/413,658, filed on Feb. 17, 2012, now Pat. No. Des. 706,872.

(60) Provisional application No. 61/600,152, filed on Feb. 17, 2012.

(56) References Cited

U.S. PATENT DOCUMENTS

| | | | |
|---|---|---|---|
| 2,240,024 | A | 4/1941 | Stone et al. |
| 2,834,135 | A | 5/1958 | Clarke |
| 3,469,335 | A | 9/1969 | Leigh |
| 3,481,061 | A | 12/1969 | William |
| D270,358 | S | 8/1983 | Errigo |
| 4,711,046 | A | 12/1987 | Herrgord |
| 4,751,115 | A * | 6/1988 | Smith .................. B60J 1/2091 160/370.23 |
| 4,877,074 | A * | 10/1989 | Castellano ............ B60J 1/2091 160/370.23 |
| 4,890,652 | A | 1/1990 | Hoerner |
| D338,241 | S | 8/1993 | Landa |
| 5,388,382 | A | 2/1995 | Brooks |
| 5,911,522 | A | 6/1999 | Wood |
| 5,960,848 | A | 10/1999 | Schirer |
| 6,155,325 | A | 12/2000 | Schirer |
| 6,272,991 | B1 | 8/2001 | Rich et al. |
| 6,382,433 | B1 | 5/2002 | Podergois |
| 6,945,398 | B2 | 9/2005 | Shumake et al. |
| 7,293,380 | B2 | 11/2007 | Repecki |
| 7,434,340 | B2 | 10/2008 | Vivro |
| 7,451,800 | B2 | 11/2008 | Johnson et al. |
| 7,647,718 | B2 | 1/2010 | Burtch |
| 7,739,816 | B2 | 6/2010 | Kowatari |
| 7,823,309 | B2 | 11/2010 | Klbenda |
| 7,886,465 | B2 | 2/2011 | Virvo |
| D653,880 | S | 2/2012 | Polidoros |
| RE44,673 | E | 12/2013 | Albenda |
| D706,872 | S | 6/2014 | Dashe |
| 8,955,243 | B2 | 2/2015 | Dashe |
| D739,467 | S | 9/2015 | Dashe |
| 2002/0066216 | A1 | 6/2002 | DeLaCruz |
| 2003/0205489 | A1 | 11/2003 | Shumake et al. |
| 2004/0148833 | A1 | 8/2004 | Virvo |
| 2004/0231203 | A1 | 11/2004 | Dobelbower et al. |
| 2005/0086842 | A1 | 4/2005 | Ternovits et al. |
| 2005/0155259 | A1 | 7/2005 | Vivro |
| 2006/0048421 | A1 | 3/2006 | Oleksak |
| 2006/0060643 | A1 | 3/2006 | Sheffer |
| 2007/0151132 | A1 | 7/2007 | Repecki |
| 2008/0178501 | A1 | 7/2008 | Crowell et al. |
| 2012/0036746 | A1 | 2/2012 | O'Donoghue |

* cited by examiner

MULTI-PANEL DISPLAY KIT

CROSS-REFERENCE TO RELATED APPLICATIONS

The present application is a continuation-in-part of U.S. patent application Ser. No. 15/680,307, filed Aug. 18, 2017, which is a continuation of U.S. patent application Ser. No. 15/294,953, filed Oct. 17, 2016, now U.S. Pat. No. 9,741,266, which is a continuation of U.S. patent application Ser. No. 14/754,802, filed Jun. 30, 2015, now U.S. Pat. No. 9,495,886, which is a continuation of U.S. patent application Ser. No. 14/614,742, filed Feb. 5, 2015, now U.S. Pat. No. 9,076,352, which is a continuation of U.S. patent application Ser. No. 14/573,044, filed Dec. 17, 2014, now abandoned, which is a continuation of U.S. patent application Ser. No. 13/769,706, filed Feb. 18, 2013, now U.S. Pat. No. 8,955,243, which: (1) is a continuation-in-part of U.S. Design application Ser. No. 29/413,658, now U.S. Pat. No. D706,872, filed Feb. 17, 2012, and (2) claims the benefit of U.S. Provisional Patent Application Ser. No. 61/600,152, filed Feb. 17, 2012, the entireties of which are hereby incorporated by reference.

FIELD OF THE INVENTION

The present invention relates generally to a multi-panel display kit including a multi-panel display device and a header panel.

BACKGROUND OF THE INVENTION

Multi-panel displays are used to display and present a variety of information, such as business information, advertising information and educational information. Furthermore, multi-panel displays are commonly used by students to present information at science fairs and other presentation forums. More recently, header panels have been developed for attaching to the multi-panel displays. These header panels are separate from the multi-panel displays and can be displayed alongside the multi-panel displays or coupled to the multi-panel displays. The header panels typically serve as a location on which a user may place a presentation title. However, such header panels must typically be purchased separately from the multi-panel display and therefore are frequently not used. Thus, a need exists for a multi-panel display kit that cures the aforementioned deficiencies.

SUMMARY OF THE INVENTION

The present invention solves these and other needs by providing a multi-panel display kit that includes a multi-panel display device and a header panel. The multi-panel display device may have a center panel, a first side panel attached to the center panel on a first side thereof, and a second side panel attached to the center panel on a second side thereof, the second side of the center panel being opposite the first side of the center panel. The first and second side panels may have a combined width that is less than a width of the center panel. The header panel may have a height that is substantially equal to the difference between the width of the center panel and the sum of the widths of the first and second side panels. Thus, in a folded state, the header panel may fit within a gap between the first and second side panels. The multi-panel display kit can be neatly packaged in a flat manner that makes for easy transport from manufacturing facility to warehouse to brick-and-mortar retail space.

In one aspect, the invention can be a multi-panel display kit comprising: a multi-panel display device comprising: a center panel extending from a first edge to a second edge, the center panel having a first width measured between the first and second edges of the center panel; a first side panel extending from a first edge to a second edge, the first edge of the first side panel attached to the first edge of the center panel by a first pre-weakened line, the first side panel having a second width measured between the first and second edges of the first side panel; a second side panel extending from a first edge to a second edge, the first edge of the second side panel attached to the second edge of the center panel by a second pre-weakened line, the second side panel having a third width measured between the first and second edges of the second side panel; and wherein the first width is greater than a sum of the second and third widths.

In another aspect, the invention can be a multi-panel display kit comprising: a multi-panel display device extending from a bottom edge to a top edge and comprising: a center panel extending from a first edge to a second edge; a first side panel extending from a first edge to a second edge, the first edge of the first side panel attached to the first edge of the center panel by a first pre-weakened line; and a second side panel extending from a first edge to a second edge, the first edge of the second side panel attached to the second edge of the center panel by a second pre-weakened line; wherein the multi-panel display device is folded about the first and second pre-weakened lines so that the first side panel covers a first portion of the center panel and the second side panel covers a second portion of the center panel, a third portion of the center panel located between the first and second portions of the center panel being exposed; and a header panel covering the third portion of the center panel without overlapping the first and second side panels.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
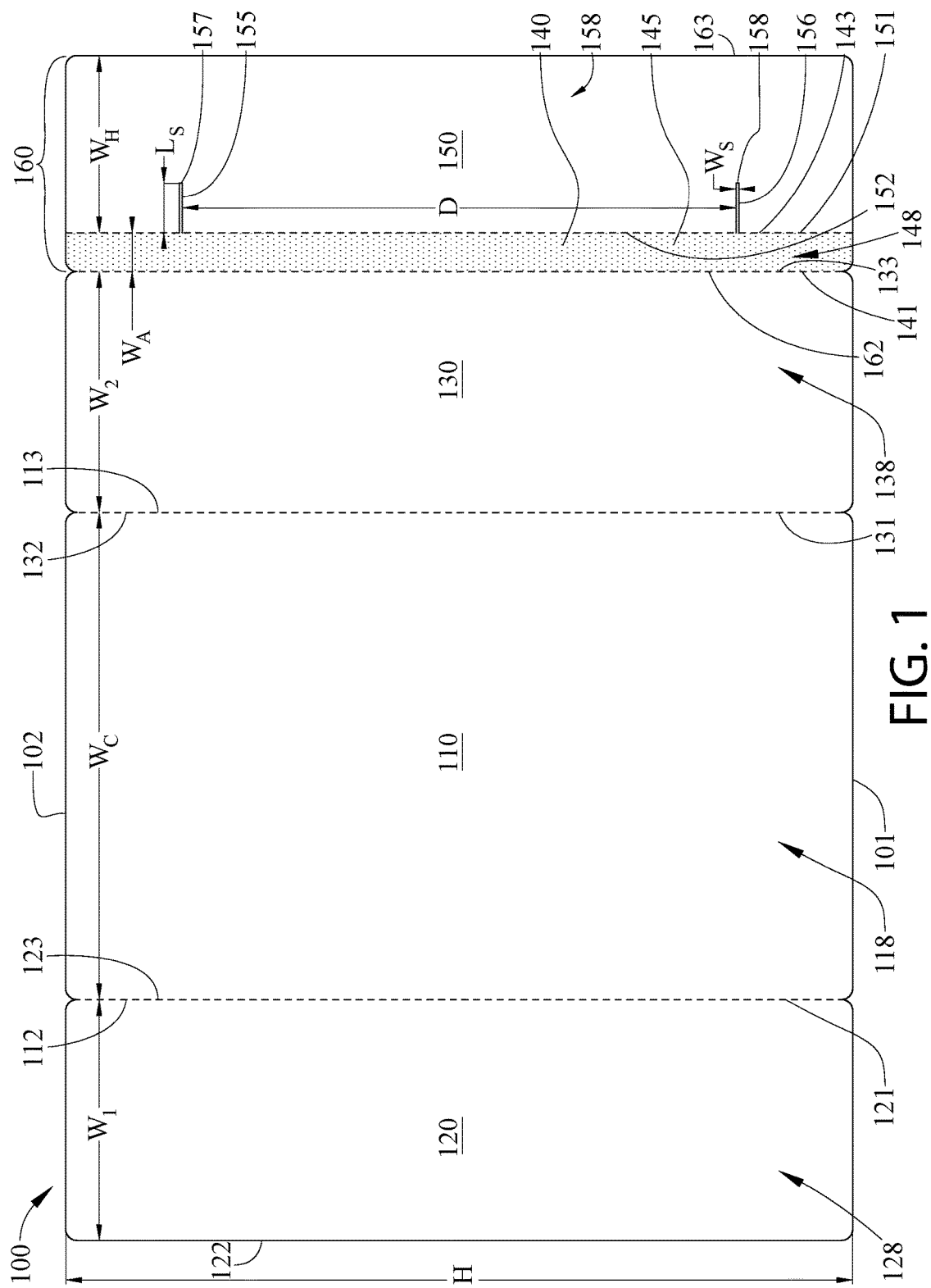
FIG. 1 is a front view of a blank for a multi-panel display according to a first embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring first to FIG. 1, a blank 100 for a multi-panel display is illustrated in accordance with an embodiment of the present invention. The blank 100 generally comprises a center panel 110, a first side panel 120, a second side panel 130 and a third panel 160. The third panel 160 comprises an adhesive panel 140 and a header panel 150. In certain embodiments the blank 100 is formed as a single, integral structure by a die cut technique. Thus, by a single die cut, the entire blank 100 comprising each of the center panel 110, the first side panel 120, the second side panel 130 and the third panel 160 can be integrally formed as a single sheet of material. Of course, the invention is not to be so limited in all embodiments and in other embodiments techniques other than the die cut technique can be used to create the blank 100 as a single integral structure or as a single sheet of material.

As illustrated in FIG. 1, a front surface 118 of the center panel 110, a front surface 128 of the first side panel 120, a front surface 138 of the second side panel 130, a front surface 148 of the adhesive panel 140 and a front surface 158 of the header panel 150 are exposed to view. In the exemplified embodiment, each of the front surfaces 118, 128, 138, 148, 158 are white (or any other color) and they form the display surface of the multi-panel display formed from the blank 100 as discussed below. In the exemplified embodiment, the rear surfaces of the panels 110, 120, 130, 140, 150 (not illustrated in FIG. 1) are not intended to be the display surface and can therefore be any color. For example, in certain embodiments the rear surfaces of the panels 110, 120, 130, 140, 150 are formed of a brown craft paper and the front surfaces 118, 128, 138, 148, 158 of the panels 110, 120, 130, 140, 150 are formed of a white flat linerboard. However, the invention is not to be specifically limited by the colors of the front and rear surfaces of the panels 110, 120, 130, 140, 150 in all embodiments.

In certain embodiments, the blank 100 is formed from a corrugated fiberboard material. For example, the blank 100 may be a double-walled construction including a fluted corrugated sheet and one or two flat linerboards forming the front and rear surfaces. The sizes of the corrugated fiberboard can be a BC-flute, a C-flute, a D-flute, an E-flute or the like. However, the invention is not to be so limited and the blank 100 can be formed from foam, cardboard, heavy-duty paper, binder's board, card stock, display board, paperboard, or the like in other embodiments. The blank 100 is intended to be used as a multi-panel display board, such as a tri-fold display board, for presenting information or school/work projects. Specifically, as discussed in more detail below the blank 100 can be altered into a multi-panel display board and the front surface thereof can be used as a display surface such that a user can write, draw, paint or otherwise create material onto the display surface such as by gluing magazine cutouts thereon or the like. Multi-panel display boards of this type are known to be used in science fairs, for school projects, or other occasions when it is desired to present information to a viewing public.

Each of the first side panel 120, the center panel 110 and the second side panel 130 has four distinct corners. Furthermore, the adhesive panel 140 has two corners and the header panel 150 has two corners. Each of the corners of the first side panel 120, the center panel 110, the second side panel 130, the adhesive panel 140 and the header panel 150 are rounded. Rounding the corners of the panels reduces the likelihood that the corners will become bent or otherwise damaged during storage and/or use of the blank 100 as a multi-panel display. Thus, rounding the corners of each of the panels improves the shelf life of the blank 100 while also adding a superior design aesthetic.

The center panel 110 is positioned between the first side panel 120 and the second side panel 130. Specifically, the center panel 110 has a first edge 112 and a second edge 113, the first side panel 120 has a first free edge 122 and a second edge 123, the second side panel 130 has a first edge 132 and a second edge 133, and the third panel 160 has a first edge 162 and a second free edge 163. In the exemplified embodiment, the first edge 162 of the third panel 160 forms the first edge of the adhesive panel 140, the adhesive panel 140 also having a second edge 143. Furthermore, in the exemplified embodiment the second free edge 163 of the third panel 160 forms a second edge of the header panel 150, the header panel 150 also having a first edge 152.

The first edge 112 of the center panel 110 is attached to the second edge 123 of the first side panel 120 along a first pre-weakened line 121. Similarly, the second edge 113 of the center panel 110 is attached to the first edge 132 of the second side panel 130 along a second pre-weakened line 131. Furthermore, the first edge 162 of the third panel 160 is detachably coupled to the second edge 133 of the second side panel 130 along a third pre-weakened line 141. The second edge 143 of the adhesive panel 140 is detachably coupled to the first edge 152 of the header panel 150 along a fourth pre-weakened line 151. Although the third panel 160 is described herein as being detachably coupled to the second side panel 130 and the header panel 150 is described as being detachably coupled to the adhesive panel 140, each of these panels is formed together on a single sheet during formation of the blank 100. The panels are detached from one another, as will be described in more detail below, when the blank 100 is used to form a multi-panel display device. In the exemplified embodiment, the first, second, third and fourth pre-weakened lines 121, 131, 141, 151 are substantially parallel to one another.

Each of the first and second pre-weakened lines 121, 131 can be a fold line, such as a depression or indentation formed into the front surface of the blank 100 that facilitates folding of the blank 100 about the first and second pre-weakened lines 121, 131. Specifically, the first pre-weakened line 121 facilitates rotating the first side panel 120 relative to the center panel 110 and the second pre-weakened line 131 facilitates rotating the second side panel 130 relative to the center panel 110. Thus, each of the first and second pre-weakened lines 121, 131 can be formed by a pre-folded line or a crease line formed into the blank 100. The techniques for forming the first and second pre-weakened lines 121, 131 are not limiting of the present invention in all embodiments but rather include any pre-formed line in the blank 100 that facilitates folding the blank 100 about the line.

In the embodiment exemplified in FIG. 1, the second side panel 130 is connected to the adhesive panel 140 and the adhesive panel 140 is connected to the header panel 150. Thus, the adhesive panel 140 is positioned in between the second side panel 130 and the header panel 150. The second side panel 130 is connected to the adhesive panel 140 by the third pre-weakened line 141 and the adhesive panel 140 is connected to the header panel 150 by the fourth pre-weakened line 151.

The fourth pre-weakened line 151 is a line formed into the blank 100 that facilitates separating the header panel 150 from the adhesive panel 140 and the third pre-weakened line 141 is a line formed into the blank 100 that facilitates separating the adhesive panel 140 from the second side panel 130. Thus, the third and fourth pre-weakened lines 141, 151 may be referred to herein as perforation lines or score lines that facilitate tearing of the blank 100 along those lines for separation of the two panels on opposing sides of the line. In certain embodiments, the third and fourth pre-weakened lines 141, 151 can be formed by a plurality of small holes that are formed through the blank 100 in a line to facilitate tearing the blank 100 at the location of the third and fourth pre-weakened lines 141, 151. Thus, in certain embodiments the third and fourth pre-weakened lines 141, 151 can be considered perforation lines. Of course, the invention is not to be so limited and the third and fourth pre-weakened lines 141, 151 can be formed by other techniques such as, for example without limitation, a deep depression in the blank 100. The third and fourth pre-weakened lines 141, 151 are configured so that the third panel 160 can be easily broken away or separated from the second side panel 120 and so that the header panel 150 can be easily broken away or separated from the adhesive panel 140.

It should be appreciated that in certain embodiments the first and second pre-weakened lines 121, 131 are different than the third and fourth pre-weakened lines 141, 151 in that the panels on opposing sides of the first and second pre-weakened lines 121, 131 are not easily separated or broken away from each other without using a cutting tool such as scissors, a blade, a knife or the like whereas the panels on opposing sides of the third and fourth pre-weakened lines are easily separated or broken away from each other without the use of a cutting tool. Specifically, the first and second pre-weakened lines 121, 131 are different than the third and fourth pre-weakened lines 141, 151 because if the sheet of material is torn at the first or second pre-weakened lines 121, 131 without using a cutting tool, the tear will be uneven and rugged, whereas tearing at the third or fourth pre-weakened lines 141, 151 creates a smooth, even tear of the sheet of material along that line even without the use of a cutting tool.

In certain embodiments whereby the blank 100 is formed from a corrugated fiberboard, the blank 100 has a thickness of between 1/16 inch and 3/16 inch, and more preferably approximately 1/8 inch. Of course, the invention is not to be so limited and the thickness of the blank 100 may be outside of that range depending on the type of material used to create the blank 100. Furthermore, the blank 100 has a height H extending from a bottom edge 101 of the blank 100 to a top edge 102 of the blank 100 that is between 30-40 inches, and more preferably approximately 35½ inches. Each of the panels has the same height, and thus the height H applies to the blank 100 as a whole or to each panel individually. Of course, heights outside of the above-recited range can be used in certain other embodiments where it is desirable to have a larger or smaller multi-panel display. Thus, the height of the blank 100 is not to be limiting of the present invention unless specifically claimed.

The first side panel 120 has a width $W_1$ extending from the first free edge 122 of the first side panel 120 to the second edge 123 of the first side panel 120. In the exemplified embodiment, the width $W_1$ of the first side panel 120 is between 9-12 inches, more preferably between 10½-11 inches, and still more preferably approximately 10⅞ inches. The center panel 110 has a width $W_C$ extending from the first edge 112 of the center panel 110 to the second edge 113 of the center panel 110. In the exemplified embodiment, the width $W_C$ of the center panel 110 is between 18-24 inches, and more preferably approximately 22 inches. The second side panel 130 has a width $W_2$ extending from the first edge 132 of the second side panel 130 to the second edge 133 of the second side panel 130. In the exemplified embodiment, the width $W_2$ of the second side panel 130 is between 9-12 inches, more preferably between 10½-11 inches, and still more preferably approximately 10⅞ inches. In the exemplified embodiment, the width $W_1$ of the first side panel 120 is substantially equal to the width $W_2$ of the second side panel 130. However, the invention is not to be so limited in all embodiments and the width $W_1$ of the first side panel 120 may be different than the width $W_2$ of the second side panel 130 in certain other embodiments.

The adhesive panel 140 has a width $W_A$ extending from the first edge 162 of the third panel 160 to the second edge 143 of the adhesive panel 140. The width $W_A$ of the adhesive panel 140 is between 1-2 inches, and more preferably approximately 1¾ inches. The header panel 150 has a width $W_H$ extending from the first edge 152 of the header panel 150 to the second free edge 163 of the third panel 160. The width $W_H$ of the header panel 150 is between 6-10 inches, more preferably between 7-9 inches, and still more preferably approximately 8 inches.

Thus, in the exemplified embodiment, the width $W_C$ and height H of the center panel 110 is approximately 22×35½ inches, respectively. However, in other embodiments the width $W_C$ and height H of the center panel 110 can be approximately 22×28 inches, 11×14 inches, or any other desired dimensions. Furthermore, the widths $W_1$, $W_2$, $W_H$, $W_A$ of the first panel 120, the second panel 130, the header panel 150 and the adhesive panel 140 are modified accordingly. Specifically, if the dimensions of the center panel 110 are 11×15 inches, then the widths of the first and second panels 120, 130 will be approximately 5½ inches each, and the combined width of the adhesive panel 140 and the header panel 150 (i.e., the width of the third panel 160) will also be approximately 5½ inches, although the width of the third panel 160 can be smaller if desired. The invention is not to be particularly limited by the dimensions, widths, lengths and heights of the various panels unless specified in the claims.

In the exemplified embodiment, the height H is greater than the width $W_C$ of the center panel 110. Furthermore, in the exemplified embodiment the width $W_2$ of the second side panel 120 is greater than or equal to the width Wc of the center panel 110 minus the width $W_1$ of the first side panel 120 (i.e., $W_2 \geq W_C - W_1$). As will be better understood from the description below, this ensures that the adhesive panel 140 does not contact any portion of the front surface 118 of the center panel 110 when the blank 100 is used to form a multi-panel display in a folded state, and instead the adhesive panel 140 adheres to the rear surface of the first side panel 120 when in the folded state.

Furthermore, similar to the discussion of the height H of the blank 100 above, it should be understood that the widths of the various panels can also be outside of the ranges described herein. The ranges described herein are intended as a description of one preferred embodiment of the present invention. However, it is desirable that as the widths of the various panels change, the ratios between the widths of the various panels remains consistent. For example, in the exemplified embodiment the ratio between the width $W_C$ of the center panel 110 and the width $W_1$ of the first side panel 120 is approximately 2:1. In certain embodiments, this ratio is maintained regardless of the particular widths used. In certain embodiments, the width $W_A$ of the adhesive panel 140 and the width $W_H$ of the header panel 150 can be larger or smaller than that described herein and the ratios of the widths $W_A$ of the adhesive panel 140 and the width $W_H$ of the header panel 150 relative to the first side panel 120, the center panel 110 and the second side panel 130 can also change. Thus, in certain embodiments it is only desirable that the ratio of the widths of the first side panel 120, the second side panel 130 and the center panel 110 remain consistent with that which is disclosed herein and that the equation $W_2 \geq W_C - W_1$ remains satisfied.

The header panel 150 comprises a first slot 155 and a second slot 156. In the exemplified embodiment, each of the first and second slots 155, 156 have the same width and length. Specifically, the first and second slots 155, 156 have a width $W_S$ that is approximately equal to the thickness of the blank 100, if not slightly larger, so as to facilitate detachably coupling the header panel 150 to the multi-panel display formed from the blank 100 as will be described in more detail below. Thus, in certain embodiments the width $W_S$ of the first and second slots 155, 156 is between 1/16 inch and 3/16 inch, and more preferably approximately ⅛ inch.

The first slot 155 has a length $L_S$ measured from the first edge 152 of the header panel 150 to a terminal end 157 of the first slot 155 and the second slot 156 has a length $L_S$ measured from the first edge 152 of the header panel 150 to a terminal end 158 of the second slot 156. The length $L_S$ of the slots 155, 156 is less than the width $W_H$ of the header panel 150. In the exemplified embodiment, the length $L_S$ of the slots 155, 156 is between 25% and 30% of the width $W_H$ of the header panel 150. Thus, the length $L_S$ of the slots 155, 156 is between approximately 1.5-3.0 inches, and more preferably between 2.0-2.4 inches. Furthermore, the first and second slots 155, 156 are spaced from one another along the length of the header panel 150 by a distance D. The distance D between the first and second slots 155, 156 is preferably between 22 and 28 inches, and more preferably approximately 25 inches. The distance D facilitates utilizing the header to display the multi-panel display in a desirable orientation with the left and second side panels 120, 130 at an optimal angle relative to the center panel 110. In certain embodiments, the distance D between the first and second slots 155, 156 is greater than the width $W_C$ of the center panel 110.

The front surface 148 of the adhesive panel 140 is at least partially coated with an adhesive material 145 to facilitate maintaining the blank 100 in a closed state when such is desired, such as during storage or sale of the blank 100. The adhesive material 145 can be any type of glue or other material in a liquid, semi-liquid or even solid state that adheres or bonds items together. Furthermore, the adhesive material 145 may be a double-sided tape, stickers, glue tabs or any other type of tacky substance that is adhered to the adhesive panel 140. In the exemplified embodiment, the adhesive material 145 coats or otherwise covers the entire front surface of the adhesive panel 140. However, the invention is not to be so limited in all embodiments and in certain other embodiments the adhesive material 145 may be sparsely positioned on the adhesive panel 140, such as by putting the adhesive material on the top and bottom of the adhesive panel 140 or around the periphery of the adhesive panel 140. Thus, the adhesive material 145 may either cover the entirety of the front surface 148 of the adhesive panel 140 or portions thereof.

Figure 2:
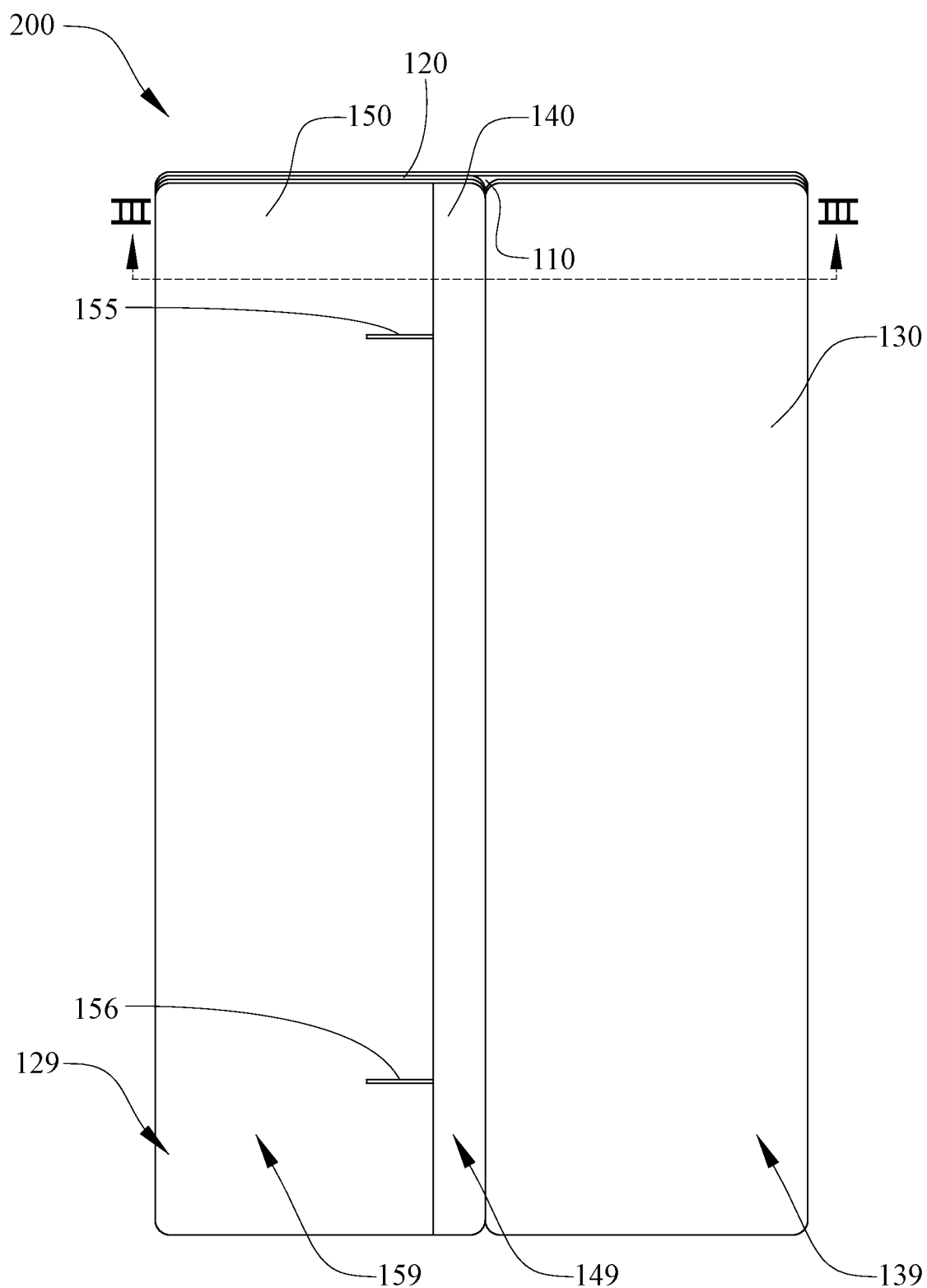
FIG. 2 is a front perspective view a multi-panel display in a folded state, wherein the multi-panel display is formed from the blank of FIG. 1.
Figure 3:
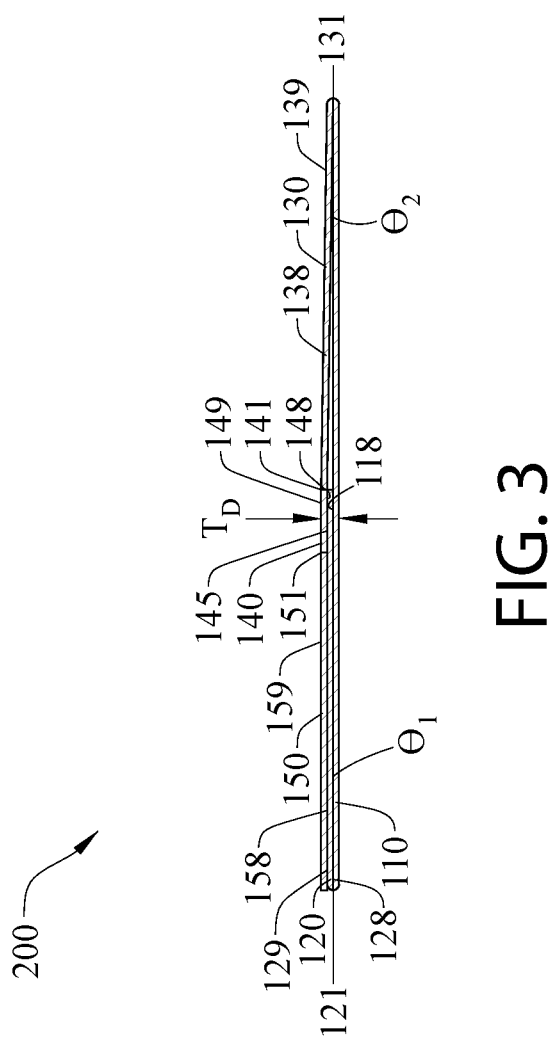
FIG. 3 is a cross-sectional view taken along line III-III of FIG. 2.
Figure 4:
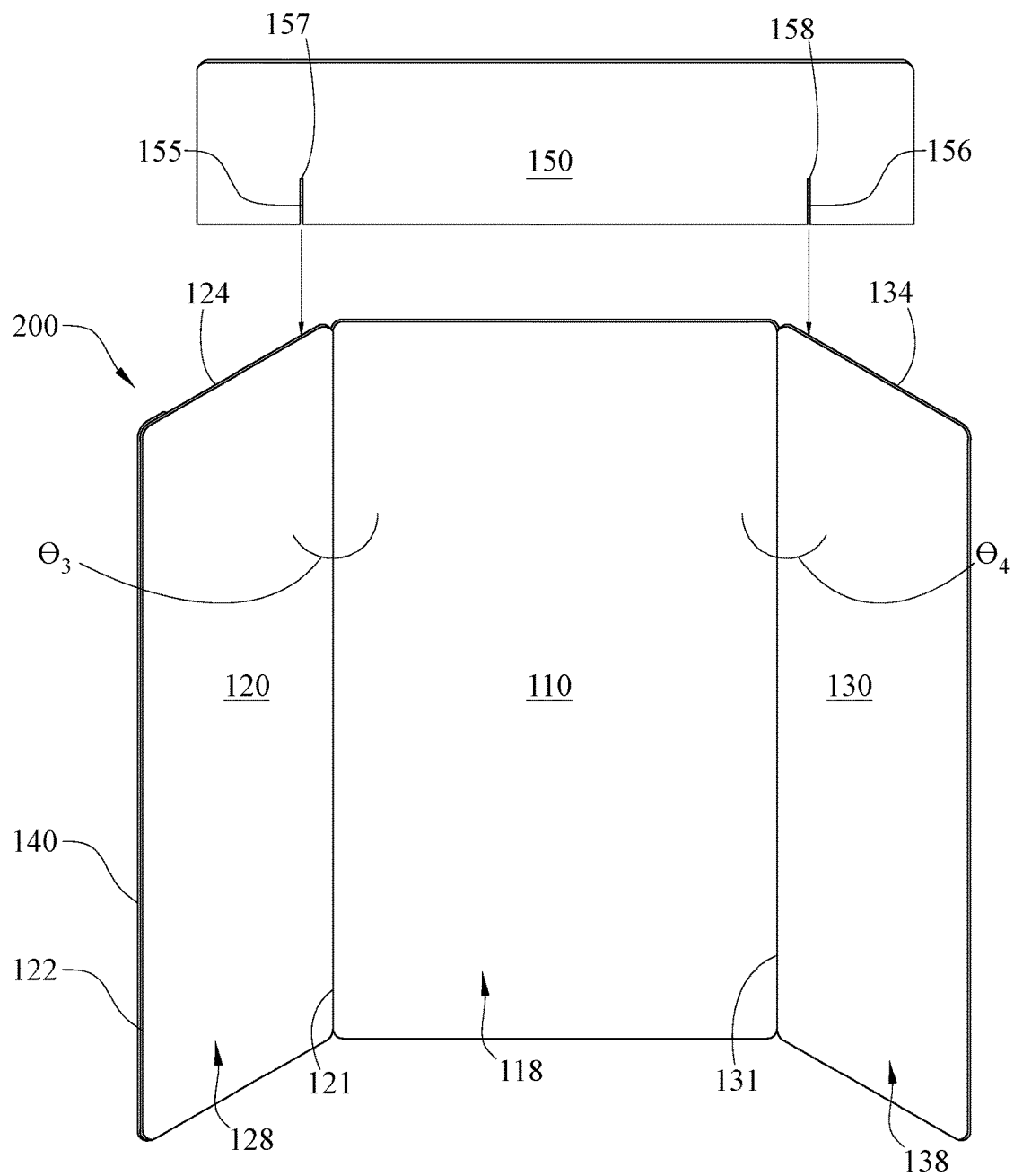
FIG. 4 is a front perspective view of the multi-panel display formed from the blank of FIG. 1, wherein the multi-panel display is in a partially assembled state.
Figure 5:
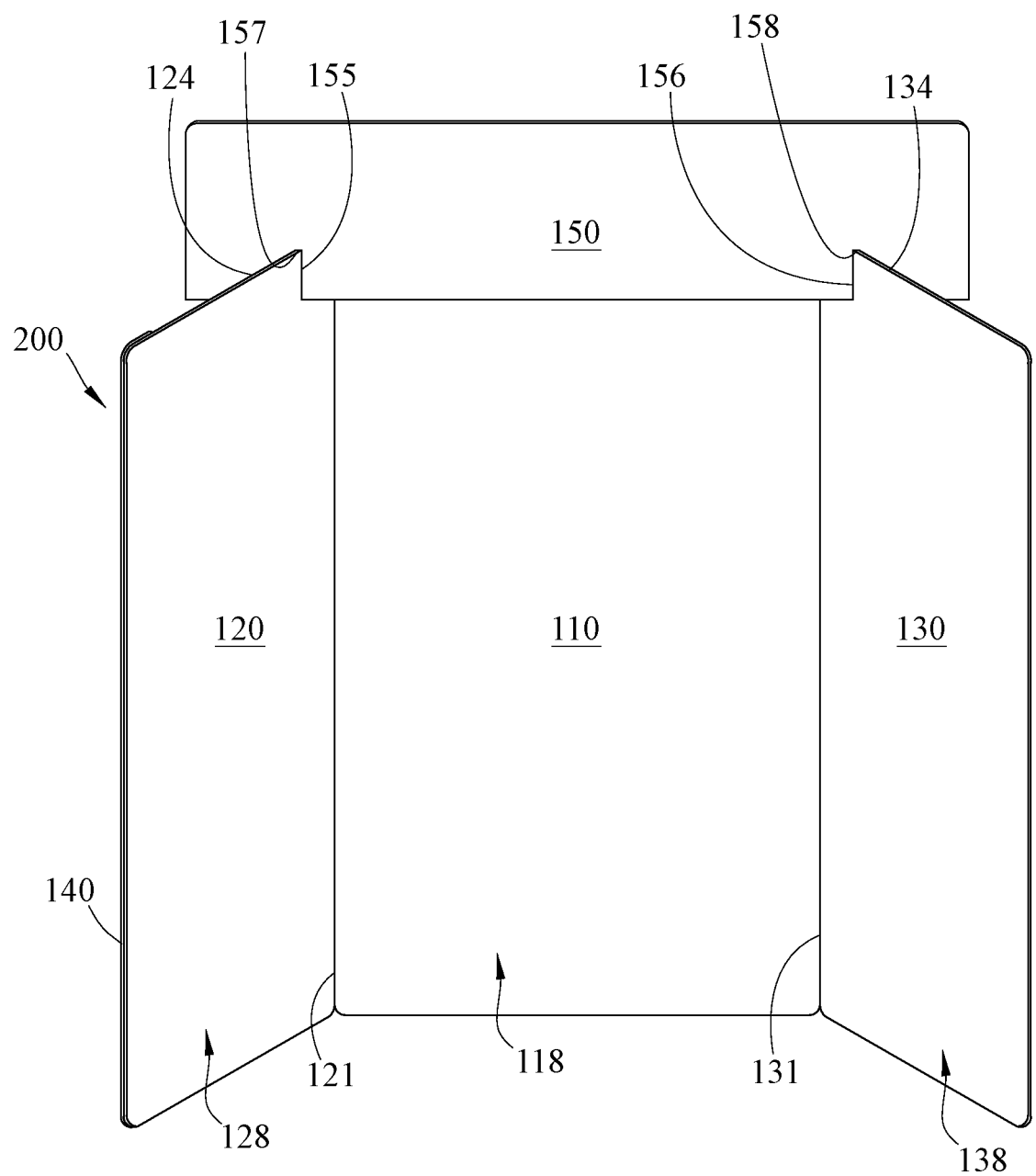
FIG. 5 is a front perspective view of the multi-panel display formed from the blank of FIG. 1, wherein the multi-panel display is in a fully assembled state.
Figure 6:
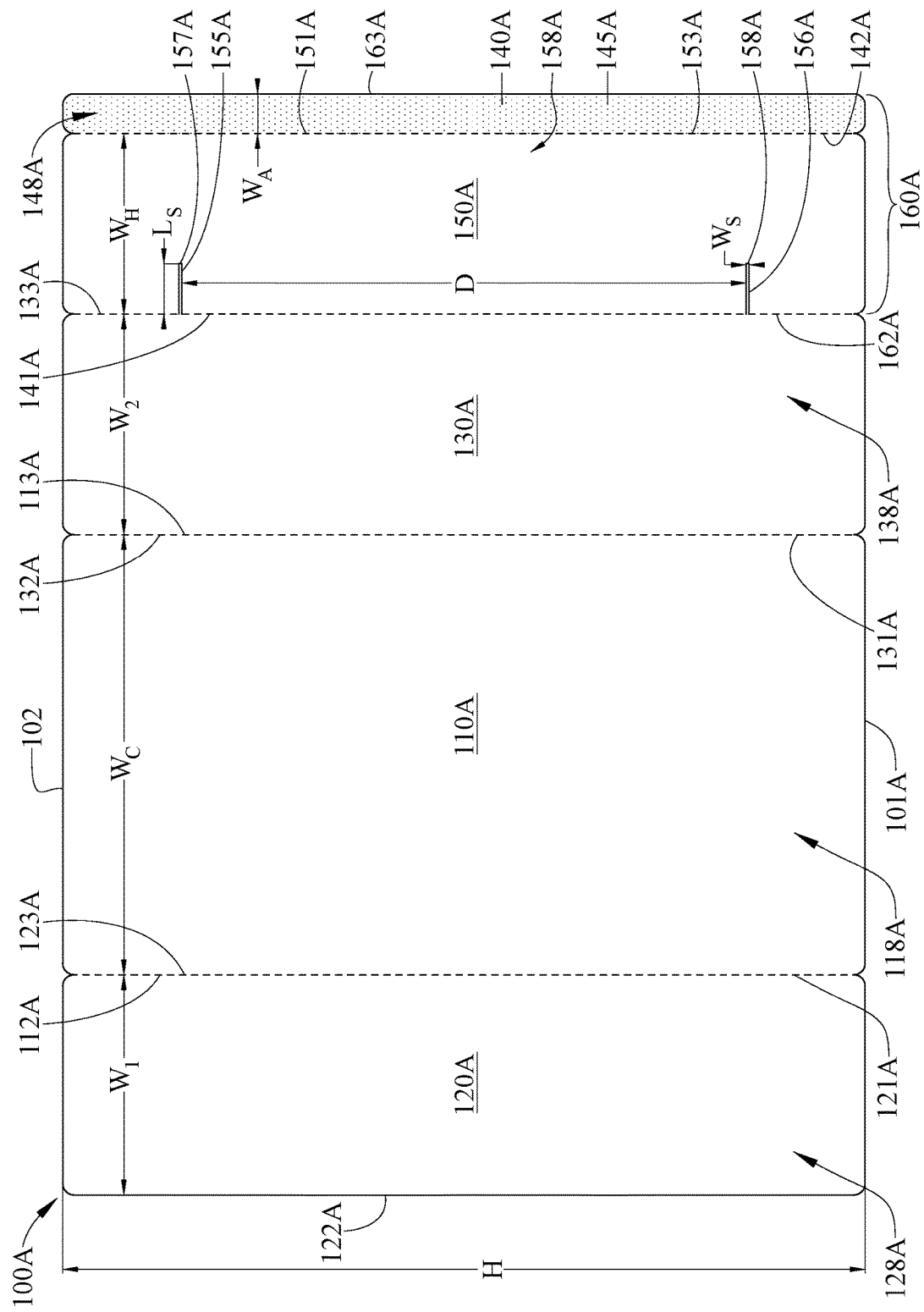
FIG. 6 is a front view of a blank for a multi-panel display according to a second embodiment of the present invention.

Referring now to FIGS. 2 and 3 concurrently, the blank 100 is illustrated as a multi-panel display device 200 in a folded state. As will be better understood from the discussion below, the multi-panel display device 200 is alterable between the folded state as illustrated in FIGS. 2 and 3 and an unfolded state as illustrated in FIGS. 4 and 5. Altering of the multi-panel display device 200 between the folded and unfolded states will be discussed below.

To convert the blank 100 into the multi-panel display 200 in the folded state illustrated in FIGS. 2 and 3, first the first side panel 120 is folded over the center panel 110 about the first pre-weakened line 121. Upon folding the first side panel 120 over the center panel 110 about the first pre-weakened line 121, the front surface 128 of the first side panel 120 lies adjacent to and faces the front surface 118 of the center panel 110. In certain embodiments, the front surface 128 of the first side panel 120 may be in surface contact with the front surface 118 of the center panel 110. Next, the second side panel 130 is folded over the center panel 110 about the second pre-weakened line 131. Upon folding the second side panel 130 over the center panel 110 about the second pre-weakened line 131, the front surface 138 of the second side panel 130 lies adjacent the front surface 118 of the center panel 110. In certain embodiments, the first side panel 120 may extend across the center panel 110 so as to be positioned in between at least a portion of the second side panel 130 and the center panel 110 when the second side panel 130 is folded about the second pre-weakened line 131 as discussed above. However, for purposes of the present invention the second side panel 130 is still considered to be overlying the center panel 110 or folded over the center panel 110.

In the exemplified embodiment, the widths $W_1$, $W_2$ of each of the first and second side panels 120, 130 is equal to approximately one-half of the width $W_C$ of the center panel 110. Thus, upon folding the second side panel 130 over the center panel 110 about the second pre-weakened line 131, the third panel 160 overlies a rear surface 129 of the first side panel 120 so that the adhesive front surface 148 of the adhesive panel 140 adheres the third panel 160 to the rear surface 129 of the first side panel 120. Specifically, the adhesive panel 140 overlaps onto the rear surface 129 of the first side panel 120 so that the front surface 148 of the adhesive panel 140 is in surface contact with the rear surface 129 of the first side panel 120. Due to the adhesive material 145 on the front surface 148 of the adhesive panel 140, the adhesive panel 140 sticks or otherwise adheres to the first side panel 120 and facilitates maintaining the multi-panel display 200 in the folded state.

In certain embodiments it is desirable that the adhesive material 145 on the front surface 148 of the adhesive panel 140 is sufficiently strong or adhesive so that the adhesive panel 140 cannot be separated from the rear surface 129 of the first side panel 120 without tearing the rear surface 129 of the first side panel 120. Furthermore, in other embodiments it is desirable that the adhesive material on the front surface 148 of the adhesive panel 140 is sufficiently strong or adhesive so that upon a user pulling on the header panel 150, the header panel 150 will separate from the adhesive panel 140 by tearing along the fourth pre-weakened line 151 and the adhesive panel 140 will remain adhered to the rear surface 129 of the first side panel 120.

In the folded state, the rear surface 129 of the first side panel 120, a rear surface 159 of the header panel, a rear surface 149 of the adhesive panel 140 and a rear surface 139 of the second side panel 130 are exposed. Thus, in the closed state none of the front surfaces 118, 128, 138, 148, 158 of the center panel 110, the first side panel 120, the second side panel 130, the adhesive panel 140 or the header panel 150 are exposed. As a result, the front surfaces of the panels (i.e., the display surfaces) are protected against damage when the multi-panel display device 200 is in the folded state. Thus, maintaining the multi-panel display device 200 in the folded state utilizing the adhesive panel 140 while on the shelves of a store protects the usable surfaces of the multi-panel display device 200 until their use is desired by a consumer.

When the multi-panel display 200 is in the folded state, the multi-panel display 200 has a combined maximum thickness $T_D$ that equals the thickness of the center panel 110, the third panel 160 and the first side panel 120. Thus, the thickness $T_D$ of the multi-panel display 200 in the folded state is between approximately 3/16 inch and 9/16 inch, and more specifically approximately 3/8 inch.

When in the folded state, the first side panel 120 is oriented at an angle $\Theta_1$ relative to the front surface 118 of the center panel 110 and the second side panel 120 is oriented at an angle $\Lambda_2$ relative to the front surface 118 of the center panel 110. In the folded state, each of the angles $\Lambda_1$ and $\Lambda_2$ are approximately between 0° and 5°.

Referring now to FIGS. 2-4 concurrently, altering or converting the multi-panel display 200 from the folded state to an unfolded state will be described. As discussed above, in certain embodiments it is preferable that the adhesive material 145 is of a sufficient tackiness or adhesiveness such that upon pulling on the second side panel 130 to alter the multi-panel display device into the unfolded state, the adhesive panel 140 remains attached to the rear surface 129 of the first side panel 120 and the header panel 150 separates from the adhesive panel 130 by tearing at the fourth pre-weakened line 151.

Specifically, upon a user pulling on the second side panel 130 in a direction away from the center panel 110, the sheet of material tears at the third pre-weakened line 141 thereby separating or breaking away the adhesive panel 140 from the second side panel 130. As a result, the second side panel 130 will rotate to an open position about the second pre-weakened line 131 while the adhesive panel 140 remains adhesively attached to the rear surface 129 of the first side panel 120. Next, the user can tear the header panel 150 from the adhesive panel 140 along the fourth pre-weakened line 151 to completely detach or break away the header panel 150 from the sheet of material. This configuration is illustrated in FIG. 4 where the adhesive panel 140 remains attached to the rear surface 129 of the first side panel 120 and the header panel 150 is separated from the multi-panel display 200. In this embodiment, the adhesive panel 140 is located adjacent to the first free edge 122 of the first side panel 120. Thus, upon tearing the sheet of material at each of the third and fourth pre-weakened lines 141, 151, the adhesive panel 140 remains attached to the rear surface 129 of the first side panel 120 and the header panel 150 becomes separated from the sheet of material.

Referring to FIGS. 4 and 5, attachment of the header panel 150 to the multi-panel display 200 to create a fully assembled multi-panel display will be described. After the header panel 150 is separated from the remainder of the sheet of material, the first and second side panels 120, 130 are made to extend outwardly from the center panel 110 in a manner oblique to a front surface 118 of the center panel 110. More specifically, the first and second side panels 120, 130 extend from the center panel at an obtuse angle. In the exemplified embodiment, in the unfolded state the first side panel 120 is oriented at an angle $\Theta_3$ relative to the front surface 118 of the center panel 110 and the second side panels 130 is oriented at an angle $\Theta_4$ relative to the front surface 118 of the center panel. Each of the angles $\Theta_3$, $\Theta_4$ is between approximately 90° and 180° relative to the front surface 118 of the center panel 110. This puts the multi-panel display 200 into an orientation such that the front surfaces 118, 128, 138 of each of the center panel 110, the first side panel 120 and the second side panel 130 are simultaneously viewable. Furthermore, the adhesive panel 140 remains attached to the rear surface 129 of the first side panel 120 so that it is out of sight when viewed from the front surfaces such as during a presentation.

After rotating the first and second panels 120, 130 about the first and second pre-weakened lines 121, 131 to position the multi-panel display 200 into the unfolded state, the header panel 150 is mounted to the multi-panel display 200. Specifically, the header panel 150 is mounted to the first and second side panels 120, 130 so as to extend upward from top edges of the first and second side panels 120, 130. More specifically, the first side panel 120 has a top edge 124 and the second side panel 130 has a top edge 134. When the header panel 150 is mounted to the first and second side panels 120, 130, the first slot 155 slidably receives the top edge 124 of the first side panel 120 and the second slot 156 slidably receives the top edge 134 of the second side panel 130. In certain embodiments, the header panel 150 is slid onto the first and second side panels 120, 130 until the terminal end 157 of the first slot 155 is in contact with the top edge 124 of the first side panel 120 and the terminal end 158 of the second slot 156 is in contact with the top edge 134 of the second side panel 130.

The distance D between the first slot 155 and the second slot 156 is configured to ensure that the first and second side panels 120, 130 are oriented at an ideal presentation or display angle relative to the center panel 110 when the header panel 150 is mounted to the first and second side panels 120, 130. In certain embodiments, this angle may be between 15-75°, more preferably between 30-60°, and still more preferably between 40-50°.

Upon mounting the header panel 150 to the first and second side panels 120, 130, the header panel 150 is non-fixedly connected to the first and second side panels 120, 130 such that the header panel 150 can be repetitively separated from and reattached to the first and second side panels 120, 130 as desired. Thus, by using the blank 100 of the present invention the use of a header panel is simplified in that it is integrally formed with and attached to the other panels of the multi-panel display so that purchasing and carrying around a separate header panel is not necessary until after the first use. Furthermore, by utilizing the adhesive panel 140, the multi-panel display of the present invention remains in the closed state until it is desired to open it for use.

FIGS. 6-10 illustrate a second embodiment of a blank 100A and a multi-panel display board 200A in accordance with another embodiment of the present invention. The blank 100A and the multi-panel display board 200A are similar to the blank 100 and the multi-panel display board 200 discussed above with reference to FIGS. 1-5 with the exception that the location of the adhesive panel 140A and the header panel 150A have been swapped. Thus, the discussion with regard to FIGS. 1-5 above is equally applicable to FIGS. 6-10 and a discussion of similar features will not be repeated below in the interest of brevity. Features from FIGS. 6-10 that are similar to features from FIGS. 1-5 will be similarly numbered, except the suffix "A" will be used. Furthermore, the discussions of the various angles, widths, heights, thicknesses and the like made above with regard to FIGS. 1-5 are equally applicable to the embodiment illustrated in FIGS. 6-10.

The blank 100A comprises a center panel 110A, a first side panel 120A, a second side panel 130A and a third panel 160A. The third panel 160A comprises a header panel 150A and an adhesive panel 140A. The positioning and attachments between the first side panel 120A, the second side panel 130A and the center panel 110A along the first and second pre-weakened areas 121A, 131A are the same as that discussed above with regard to FIG. 1. However, in FIG. 6 the third panel 160A has a first edge 162A and a second free edge 163A. The header panel 150A comprises the first edge 162A of the third panel 160A and a second edge 153A. Furthermore, the adhesive panel 140A comprises the second free edge 163A of the third panel 160A and a first edge 142A. The first edge 162A of the third panel 160A (and also of the header panel 150A) is attached to the second edge 133A of the second side panel 130A along a third pre-weakened line 141A. Furthermore, the second edge 153A of the header panel 150A is attached to the first edge 142A of the adhesive panel 140A along a fourth pre-weakened line 151A. The structure and functionality of the first, second, third, and fourth pre-weakened lines 121A, 131A, 141A, 151A is the same as discussed above with regard to FIGS. 1-5. Thus, the main difference between the blank 100A and the blank 100 is that the header panel 150A is adjacent to the second side panel 130A in the blank 100A.

The first side panel 120A has a width $W_1$, the center panel 110A has a width $W_C$, the second side panel 130A has a width $W_2$, the header panel 150A has a width $W_H$ and the adhesive panel 140A has a width $W_A$. The widths of the panels are similar to or the same as that discussed above with regards to FIGS. 1-5. For the blank 100A, it is preferable that the equation $W_2+W_H \geq W_C-W_1$ is met. This ensures that the adhesive panel 140A adheres to the rear surface 129A of the first side panel 120A when the blank 100A is used to form a multi-panel display 200A in a folded state as discussed below.

Furthermore, in the blank 100A all four corners of each of the panels 110A, 120A, 130A, 140A, 150A are rounded corners. Specifically, the attachment lines between the various panels do not extend all the way to the bottom and top edges of each of the panels. Thus, the panels curve into the attachment lines (i.e., into the first, second, third and fourth pre-weakened lines), which creates the rounded corners. Again, this reduces the likelihood that the corners will become bent or otherwise damaged during storage and/or use of the blank 100 as a multi-panel display. Thus, rounding the corners of each of the panels improves the shelf life of the blank 100 while also adding a superior design aesthetic.

The header panel 150A comprises a first slot 155A having a first terminal end 157A and a second slot 156A having a second terminal end 158A. The first and second slots 155A, 156A of the header panel 150A are similar to the first and second slots 155, 156 of the header panel 150 discussed above. Furthermore, the front surface 148A of the adhesive panel 140A is at least partially coated with an adhesive material 145A to facilitate maintaining the blank 100A in a folded or closed state when desired. The adhesive material 145A can be any of the adhesive materials 145 discussed above with regard to the blank 100.

Figure 7:
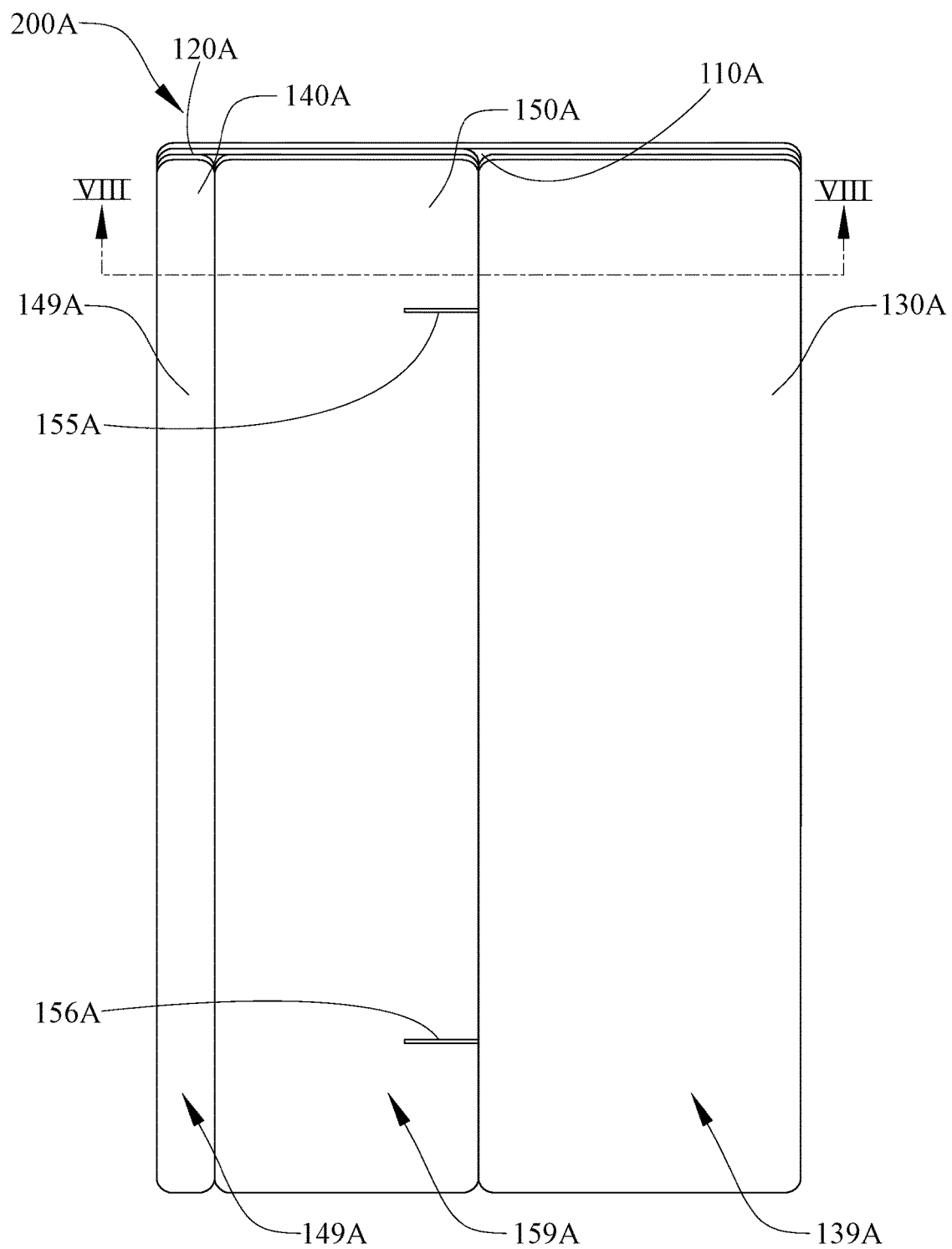
FIG. 7 is a front perspective view a multi-panel display in a folded state, wherein the multi-panel display is formed from the blank of FIG. 6.
Figure 8:
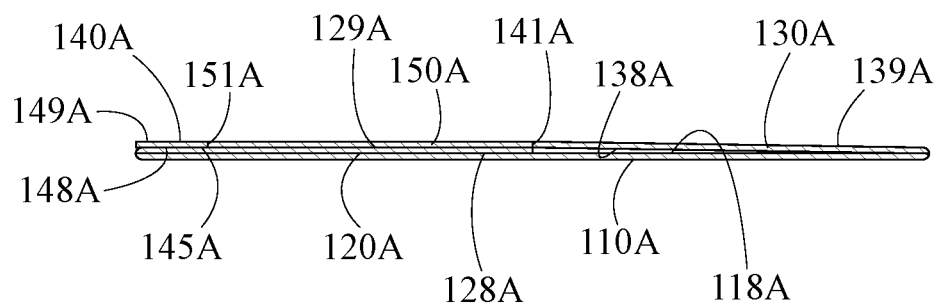
FIG. 8 is a cross-sectional view taken along line VIII-VIII of FIG. 7.

Referring to FIGS. 7 and 8 concurrently, using the blank 100A as a multi-panel display 200A in a folded state will be described. In FIGS. 7 and 8, the blank 100A has been folded to form the multi-panel display 200A in the folded state. Specifically, the first side panel 120A is folded over the center panel 110A about the first pre-weakened line 121A. The second side panel 120A is folded over the center panel 110A about the second pre-weakened line 131A. Upon folding the second side panel 120A over the center panel 110A, the third panel 160A including both the header panel 150A and the adhesive panel 140A overlies a rear surface 129A of the first side panel 120A. More specifically, the front surface 158A of the header panel 150A and the front surface 148A of the adhesive panel 140A overlie and potentially come into contact with the rear surface 129A of the first side panel 120A.

Upon the front surface 148A of the adhesive panel 140A coming into contact with the rear surface 129A of the first side panel 120A, the adhesive panel 140A adheres to the rear surface 129A of the first side panel 120A. Thus, the adhesive panel 140A maintains the multi-panel display 200A in the folded state.

When it is desired to alter the multi-panel display 200A from the folded state into the unfolded state, a user will pull on the second side panel 130A in a direction away from the center panel 110A, which will cause the second side panel 120A to break away or separate from the third panel 160A (i.e., the header panel 150A) along the third pre-weakened line 141A. The second side panel 130A is then rotated out relative to the center panel 110A along the second pre-weakened line 131A to expose the front surfaces 138A, 118A of the center panel 110A and the second side panel 130A. At this point, the header panel 150A remains attached to the adhesive panel 140A along the fourth pre-weakened line 151A and the adhesive panel 140A remains adhered to the rear surface 129A of the first side panel 120A. Thus, next the user will pull on the header panel 150A so as cause the header panel 150A to break away or separate from the adhesive panel 140A along the fourth pre-weakened line 151A. At this point, the header panel 150A is completely separated from the sheet of material, and the first side panel 120A can be rotated out relative to the center panel 110A along the first pre-weakened line 121A. Furthermore, at this point the adhesive panel 140A remains adhered to the rear surface 129A of the first side panel 120A.

Figure 9:
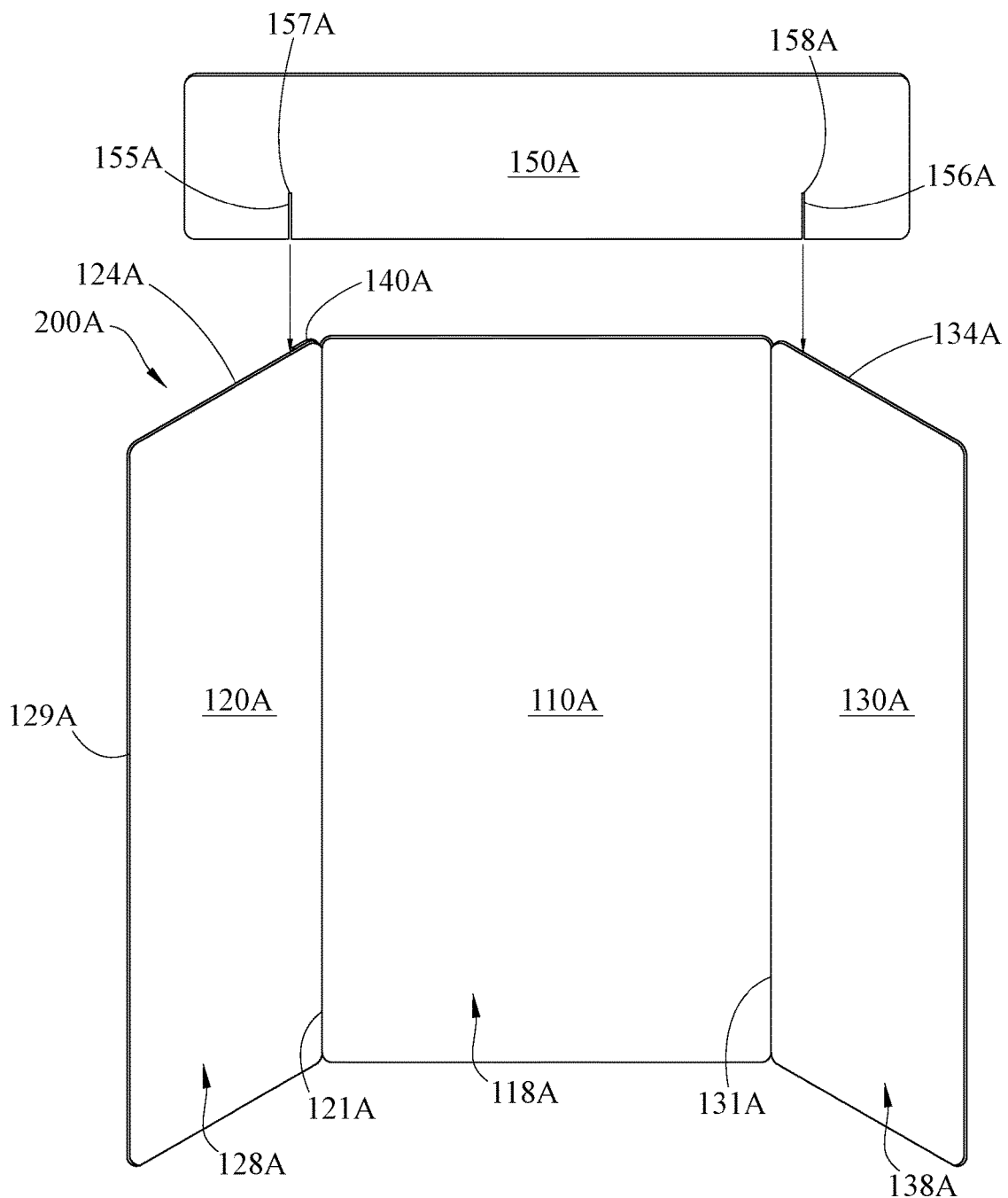
FIG. 9 is a front perspective view of the multi-panel display formed from the blank of FIG. 6, wherein the multi-panel display is in a partially assembled state.

FIG. 9 illustrates the multi-panel display 200A after the header panel 150A has been removed, the first side panel 120A has been rotated along the first pre-weakened line 121A and the second side panel 130A has been rotated along the second pre-weakened line 131A. As can be seen, the adhesive panel 140A remains adhered to the rear surface 129A of the first side panel 120A. In this embodiment, the adhesive panel 140A is adhered to the rear surface 129A of the first side panel 120A at a location adjacent the first pre-weakened line 121A. Of course, the location at which the adhesive panel 140A is adhered to the rear surface 129A of the first side panel 120A can be changed depending on the various widths panels.

Figure 10:
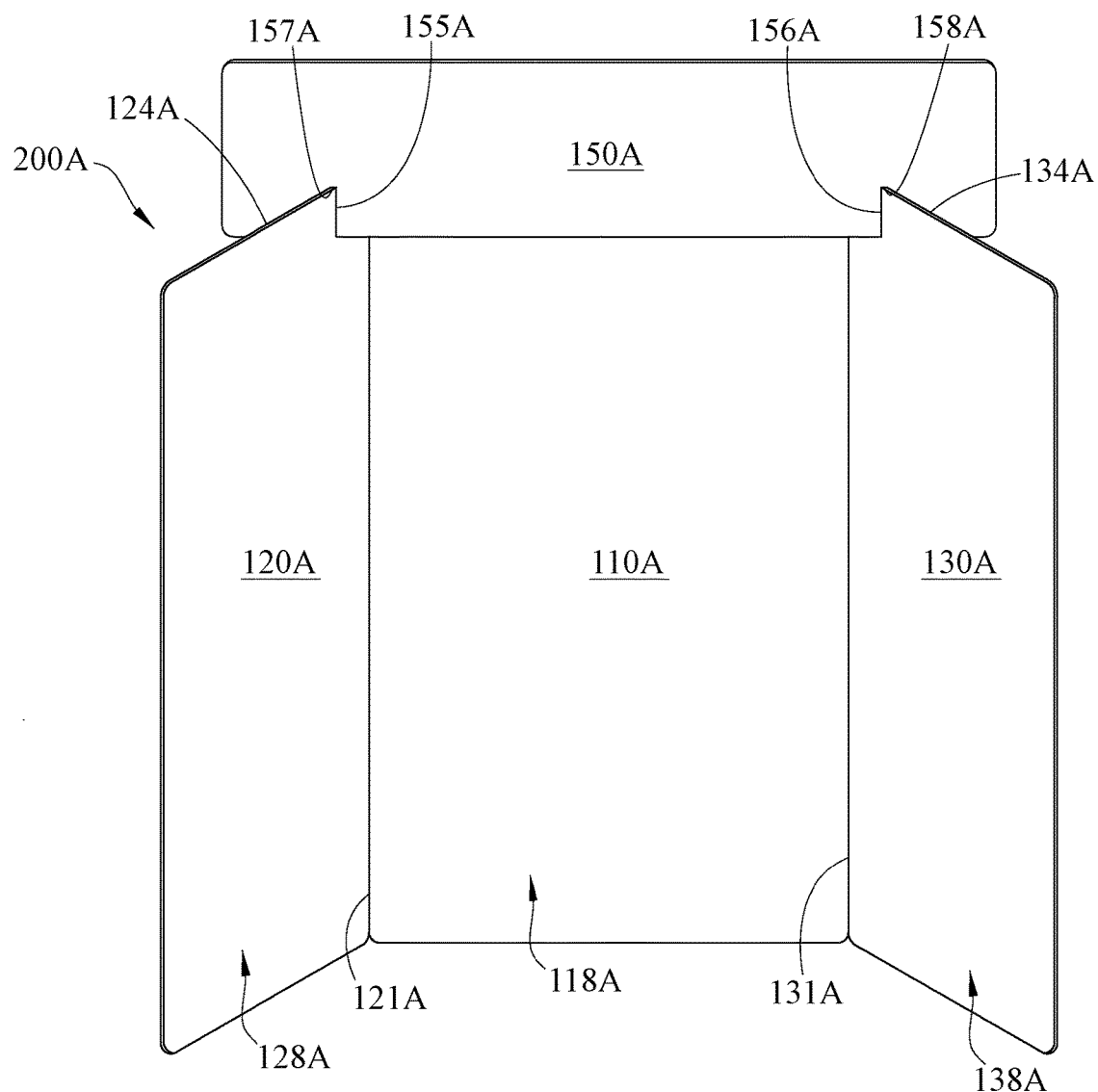
FIG. 10 is a front perspective view of the multi-panel display formed from the blank of FIG. 6, wherein the multi-panel display is in a fully assembled state.

Referring to FIGS. 9 and 10 concurrently, after the multi-panel display device 200A is altered into the unfolded state, the header panel 150A is mounted onto the first and second side panels 120A, 130A in the same manner as discussed above with regard to the multi-panel display device 200. Specifically, the header panel 150A is mounted to the first side panel 120A so that a top edge 124A of the first side panel 120A is received within a first slot 155A in the header panel 150A. The header panel 150A is mounted to the second side panel 130A so that a top edge 134A of the second side panel 130A is received within a second slot 156A in the header panel 150A. The header panel 150A can be slid onto the first and second side panels 120A, 130A until the top edges 124A, 134A of the first and second side panels 120A, 130A come into contact with the terminal ends 157A, 158A of the first and second slots 155A, 156A, respectively. This positioning is illustrated in FIG. 10.

Upon mounting the header panel 150A to the first and second side panels 120A, 130A, the adhesive panel 140A is hidden behind the header panel 150A. Thus, in this embodiment the location of the adhesive panel 140A is such that it is completely blocked from view by being adhered to the rear surface 129A of the first side panel 120A and due to the positioning of the header panel 150A. The header panel 150A can be used to both present a title or other information for the multi-panel display 200A such as during a presentation and can ensure that the first and second side panels 120A, 130A remain oriented at a particularly desired angle relative to the center panel 110A for optimal viewing.

Figure 11:
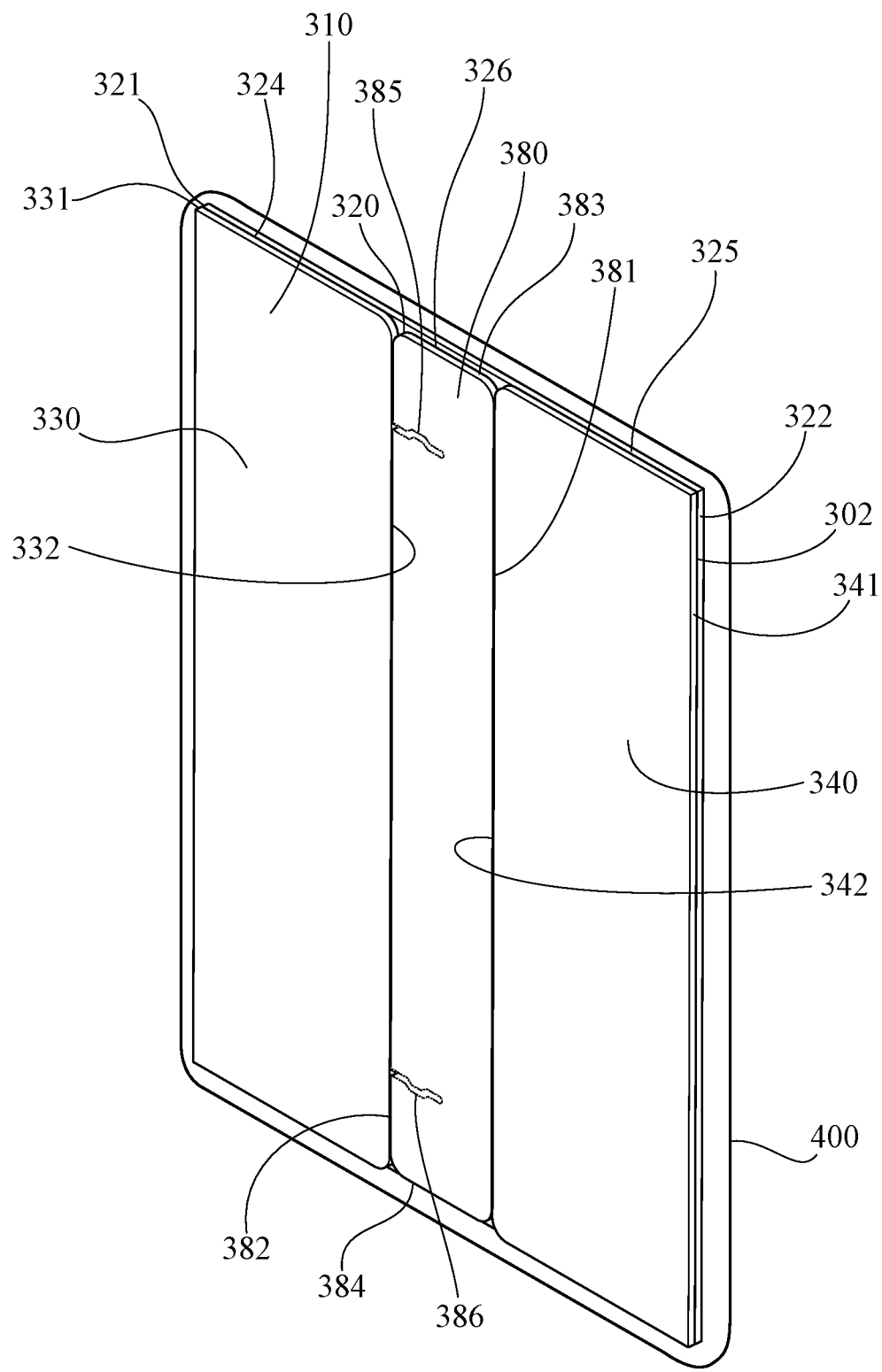
FIG. 11 is a front perspective view of a multi-panel display kit including a multi-panel display device and a header panel in a folded state in accordance with an embodiment of the present invention.
Figure 12:
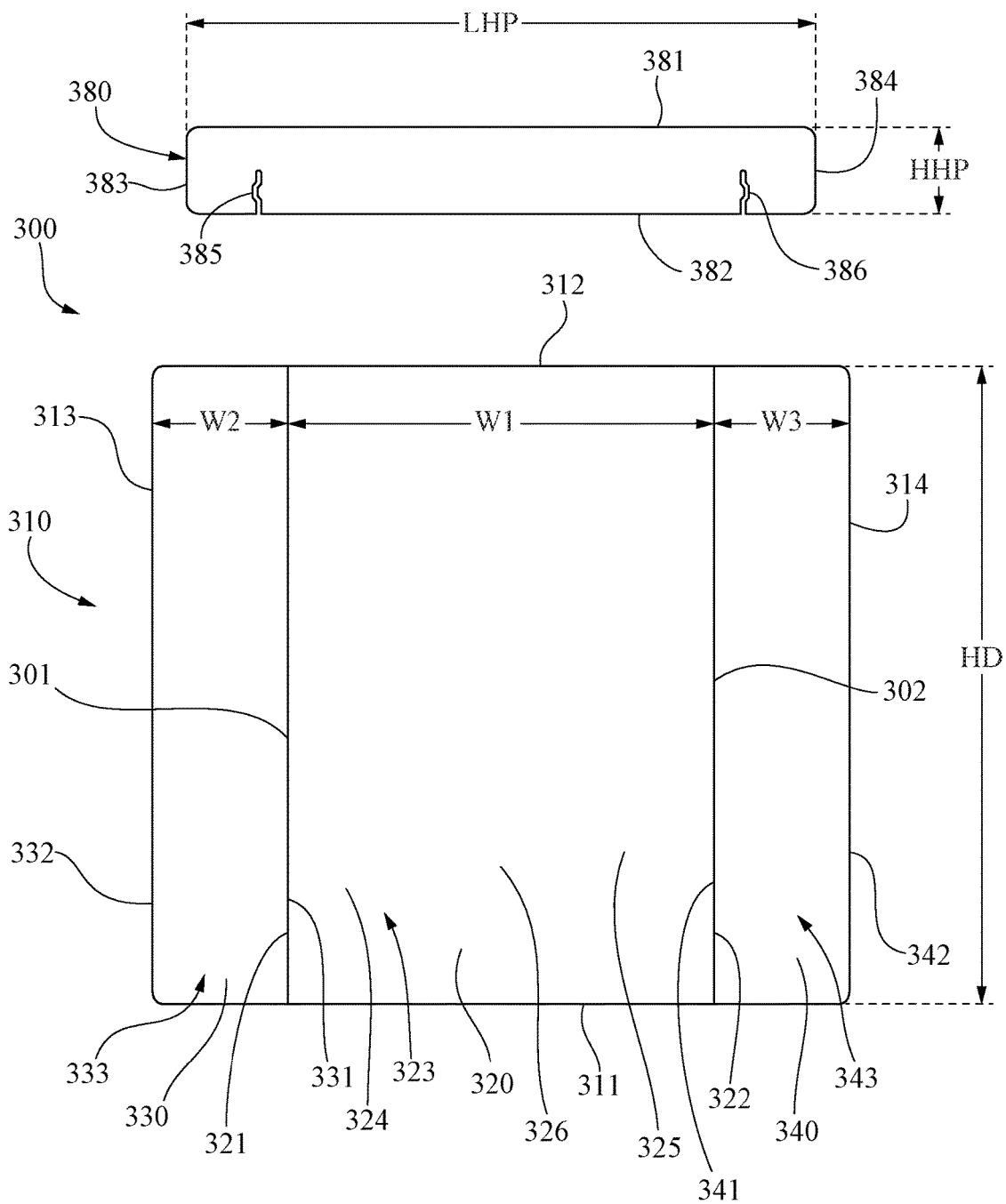
FIG. 12 is a front view of the multi-panel display kit of FIG. 11 in an unfolded state.

Referring to FIGS. 11-16, a multi-panel display kit 300 will be described in accordance with an embodiment of the present invention. The multi-panel display kit 300 generally comprises a multi-panel display device 310 and a header panel 380. The multi-panel display device 310 is similar to the multi-panel display device 200 described above and thus certain features of the multi-panel display device 310 will not be described in detail, it being understood that the description of the multi-panel display device 200 is applicable. The multi-panel display device 310 is alterable between a folded state as illustrated in FIG. 11 and an unfolded state as illustrated in FIG. 12.

Figure 16:
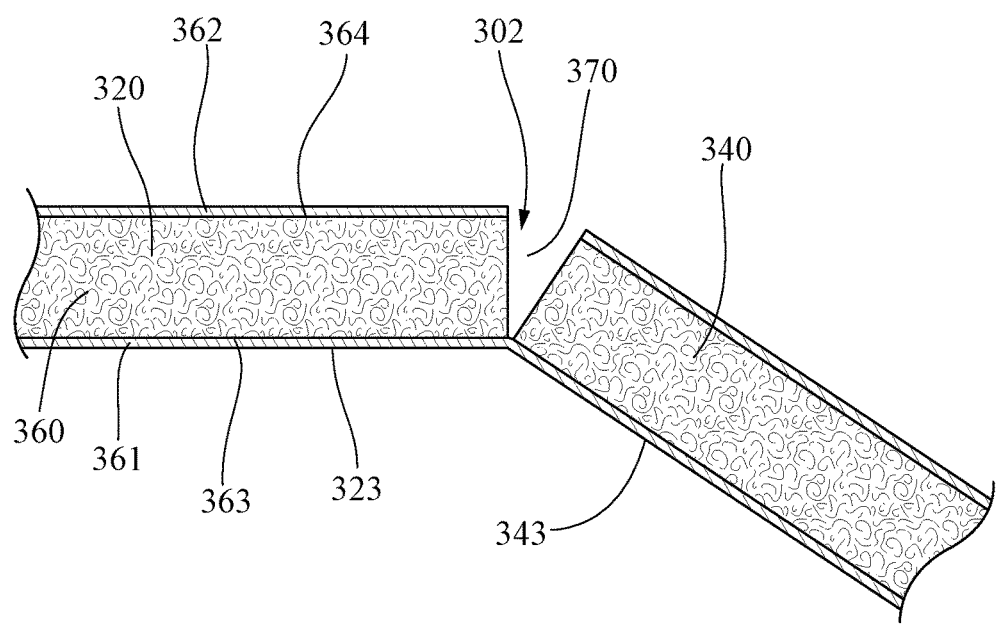
FIG. 16 is a cross-sectional view taken along line XVI-XVI of FIG. 15.

The multi-panel display device 310 and the header panel 380 may each be formed of a foam board in some exemplary embodiments, such as illustrated in FIG. 16 and described in more detail below. For example, the multi-panel display device 310 and the header panel 380 may be a paper-faced foam board such that the foam board is covered on one or both major surfaces with paper. However, the invention is not to be so limited and one or both of the multi-panel display device 310 and the header panel 380 may alternatively be formed of any of the materials described above such as corrugated fiberboard, cardboard, heavy-duty paper, binder's board, card stock, display board, paperboard, or the like in other embodiments. Thus, the multi-panel display device 310 and the header panel 380 may be formed of any material typically used to form these types of product.

Figure 13:
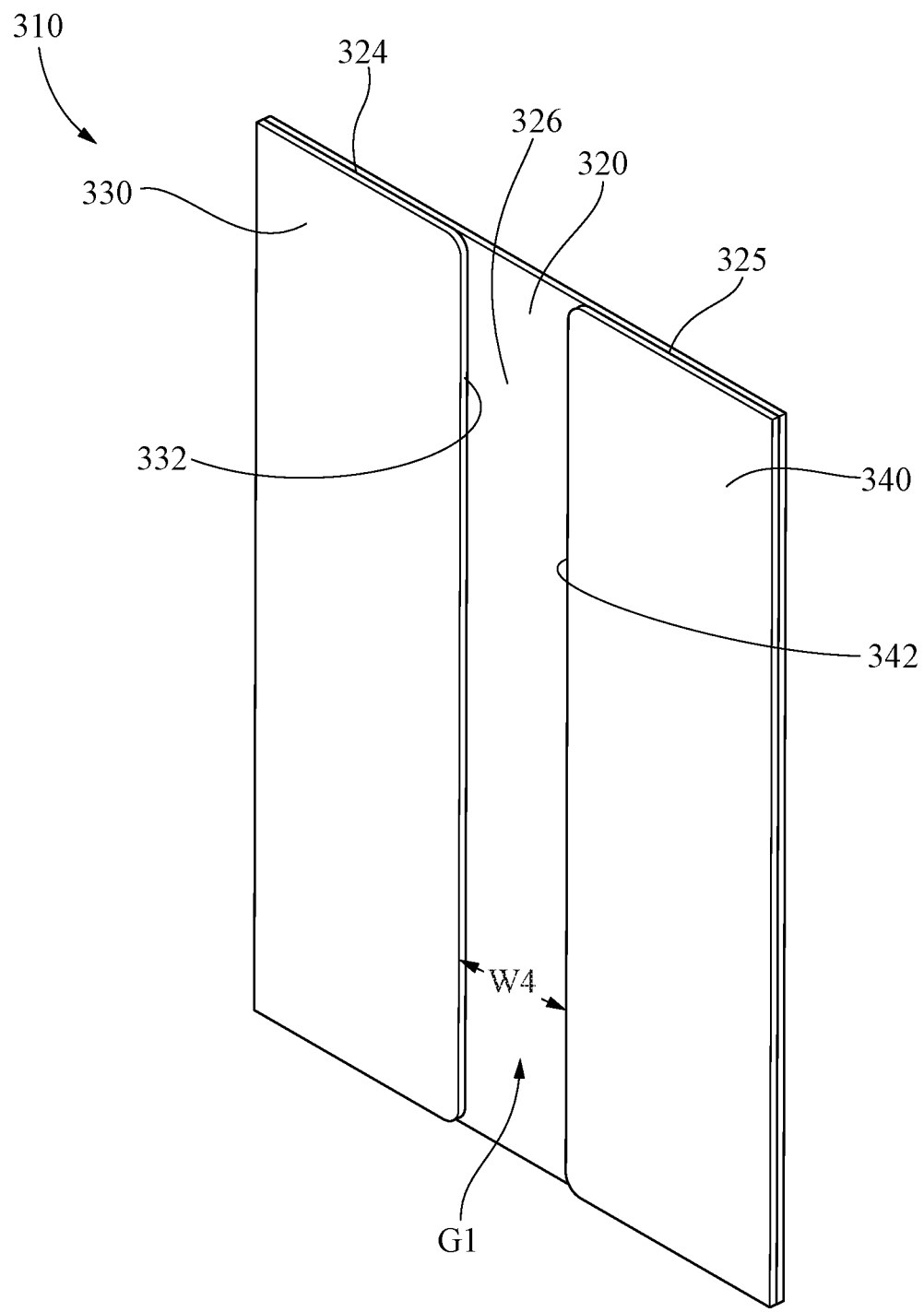
FIG. 13 is a front view of the multi-panel display device of the multi-panel display kit of FIG. 11.
Figure 14:
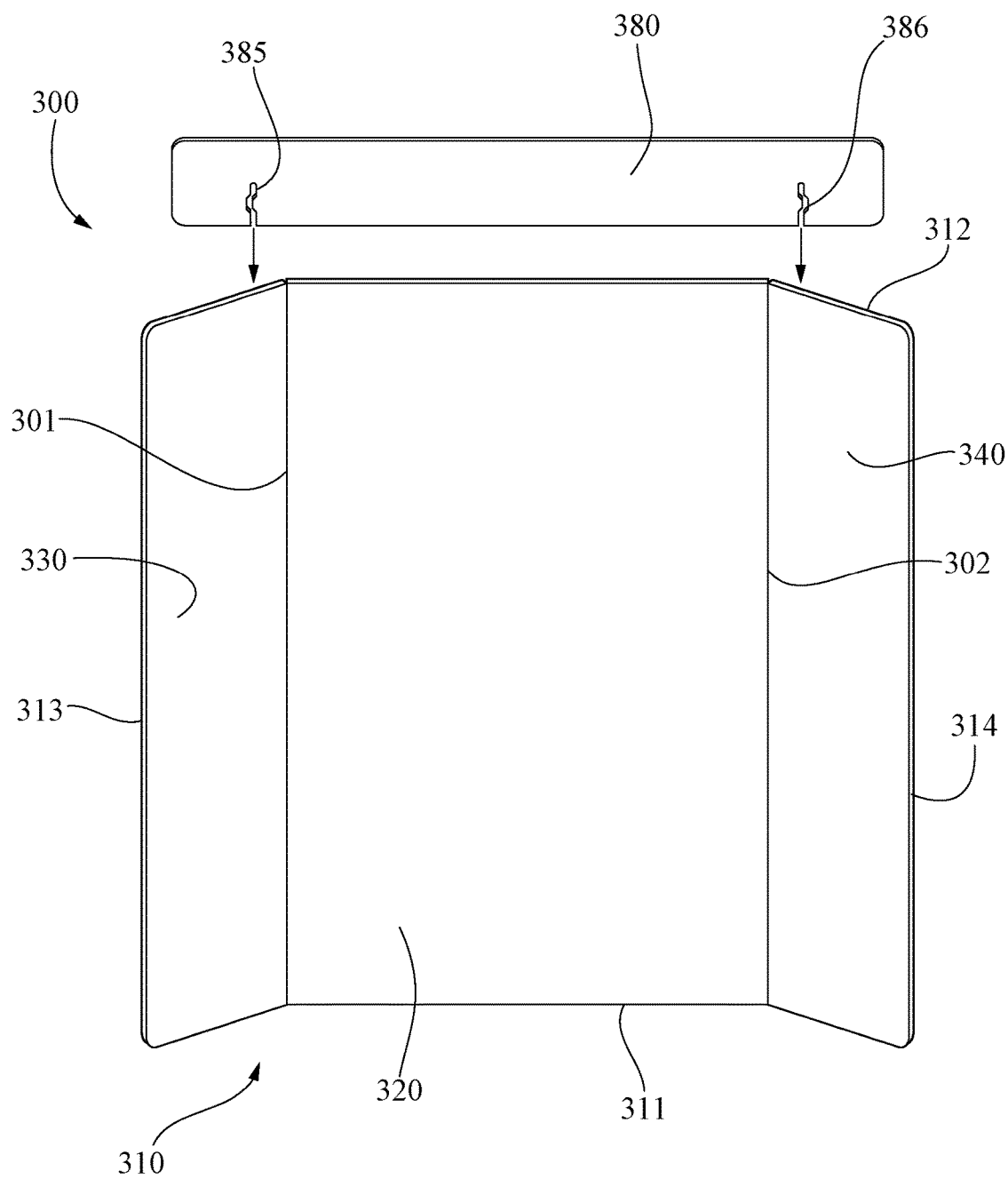
FIG. 14 is a front view of the multi-panel display kit of FIG. 11, illustrating the manner in which the header panel is attached to the multi-panel display device.

Referring to FIGS. 11-13, the multi-panel display kit 300 will be further described. The multi-panel display device 310 comprises a center panel 320 extending from a first edge 321 to a second edge, a first side panel 330 extending from a first edge 331 to a second edge 332, and a second side panel 340 extending from a first edge 341 to a second edge 342. The first edge 331 of the first side panel 330 is attached to the first edge 321 of the center panel 320 by a first pre-weakened line 301. The first edge 341 of the second side panel 340 is attached to the second edge 322 of the center panel 320 by a second pre-weakened line 302. In the exemplified embodiment, the multi-panel display device 310 is an integral sheet of material that comprises the center panel 320 and the first and second side panels 330, 340. Thus, in the exemplified embodiment the multi-panel display device 310 forms a trifold-type display device. In the folded state, the first and second side panels 330, 340 overlap the center panel 320 and in the unfolded state the first and second side panels 330, 340 do not overlap the center panel 320.

The multi-panel display device 310 comprises a bottom edge 311, a top edge 312, a first side edge 313, and a second side edge 314. The second edge 332 of the first side panel 330 forms the first side edge 313 of the multi-panel display device 310. The second edge 342 of the second side panel 340 forms the second side edge 314 of the multi-panel display device 310. Thus, the second edge 332 of the first side panel 330 and the second edge 342 of the second side panel 340 are free edges of the multi-panel display device 310. Furthermore, each of the center panel 320 and the first and second side panels 330, 340 extends from the bottom edge 311 of the multi-panel display device 310 to the top edge 312 of the multi-panel display device 310. The multi-panel display device 310 has a height HD measured between the bottom and top edges 311, 312. Each of the center panel 320, the first side panel 330, and the second side panel 340 also has the height HD because they each extend from the bottom edge 311 to the top edge 312. Thus, each of the top and bottom edges 311, 312 are planar such that they are level and flat. Furthermore, the top and bottom edges 311, 312 are parallel to one another.

The first side panel 330 is configured to be folded relative to the center panel 320 about the first pre-weakened line 301. The second side panel 340 is configured to be folded relative to the center panel 320 about the second pre-weakened line 302. Thus, by folding and unfolding the first and second side panels 330, 340 about the first and second pre-weakened lines 301, 302, the multi-panel display device 310 can be altered between the folded and unfolded states. During use to display information or the like, the multi-panel display device 310 is in the unfolded state. However, the multi-panel display device 310 can readily be altered into the folded state to reduce the footprint of the multi-panel display device 310 for transport or the like.

The center panel 320 has a first width W1 measured between the first and second edges 321, 322 of the center panel 320. The first side panel 330 has a second width W2 measured between the first and second edges 331, 332 of the first side panel 330. The second side panel 340 has a third width W3 measured between the first and second edges 341, 342 of the second side panel 340. In the exemplified embodiment, the first width W1 is greater than each of the second and third widths W2, W3. In fact, in the exemplified embodiment the first width W1 is greater than a sum of the second and third widths W2, W3. In some embodiments, a ratio of the first width W1 to each of the second and third widths W2, W3 is between 2.2:1 and 2.8:1, more specifically 2.4:1 and 2.6:1, and more specifically 2.45:1 and 2.55:1. Of course, ratios outside of the noted ranges are possible in other embodiments. In some embodiments, the second width W2 may be the same as the third width W3. Furthermore, each of the second and third widths W2, W3 may be approximately 35%-45%, or more specifically approximately 40% of the first width W1.

The center panel 320 comprises a front surface 323, the first side panel 330 comprises a front surface 333, and the second side panel 340 comprises a front surface 343 such that the front surfaces 323, 333, 343 of the center panel 320 and the first and second side panels 330, 340 collectively forms a front surface of the multi-panel display device 310. When the multi-panel display device 310 is in the folded state, the first side panel 330 overlaps a first portion 324 of the center panel 320 and the second side panel 340 overlaps a second portion 325 of the center panel 320. Specifically, the first side panel 330 covers (or overlies) the first portion 324 of the center panel 320 and the second side panel 340 covers (or overlies) the second portion 325 of the center panel 320 while a third portion 326 of the center panel 320 that extends between the first and second portions 324, 325 of the center panel 320 remains exposed. Because the first width W1 of the center panel 320 is greater than the sum of the second and third widths W2, W3 of the first and second side panels 330, 340, the third portion 326 of the center panel 320 remains exposed because it is not covered by either of the first or second side panels 330, 340. Furthermore, when in the folded state, the front surface 333 of the first side panel 330 faces the front surface 323 of the center panel 320 and the front surface 343 of the second side panel 340 faces the front surface 323 of the center panel 320. In some embodiments, in the folded state the front surfaces 333, 343 of the first and second side panels 330, 340 may contact the front surface 323 of the center panel 320.

Thus, when the multi-panel display device 310 is in the folded state, the first and second side panels 330, 340 overlap the center panel 320. However, the first and second side panels 330, 340 do not overlap one another. Moreover, the first, second, and third portions 324, 325, 325 of the center panel 320 do not overlap one another, but rather they are separate and distinct portions of the center panel 320. The first, second, and third portions 324, 325, 326 of the center panel 320 may collectively form the entirety of the center panel 320.

Because the sum of the second and third widths W2, W3 is less than the first width W1, when the multi-panel display device 310 is in the folded state, the third portion 326 of the center panel 320 is not covered by the first and second side panels 330, 340. The third portion 326 of the center panel 320 is aligned with a gap G1 between the second edge 332 of the first side panel 330 and the second edge 342 of the second side panel 340. The gap G1 (and hence also the third portion 326 of the center panel 320) has a fourth width W4. In the exemplified embodiment, the fourth width W4 is less than each of the second and third widths W2, W3. In some embodiments, the fourth width W4 may be between 10% and 30%, and more specifically approximately 20% of the first width W1.

The header panel 380 comprises a top edge 381, a bottom edge 382, a first side edge 383, and a second side edge 384. The header panel 380 has a height HHP measured between the top and bottom edges 381, 382. The header panel 380 also has a length LHP measured between the first and second side edges 383, 384. The header panel 381 comprises a first slot 385 extending from the bottom edge 382 towards the top edge 381 and a second slot 386 extending from the bottom edge 382 towards the top edge 382. The first and second slots 385, 386 are spaced apart from one another such that the first slot 385 is closer to the first side edge 383 and the second slot 386 is closer to the second side edge 384. The first and second slots 385, 386 are configured to receive portions of the top edge 312 of the multi-panel display device 310 to couple the header panel 380 to the multi-panel display device 310.

The first and second slots 385, 386 have a similar purpose and function to the slots 155, 156 described above. In the exemplified embodiment, each of the first and second slots 385, 386 are S-shaped slots. Thus, the first and second slots 385, 386 have two aligned portions that are separated by an offset portion. This arrangement may achieve a tighter fit between the header panel 380 and the multi-panel display device 310 to better maintain the coupling and prevent the header panel 380 from being accidentally separated from the multi-panel display device 310. However, the invention is not to be so limited and the first and second slots 385, 386 could be straight slots similar to the slots 155, 156 in alternative embodiments.

The height HHP of the header panel 380 is equal to or less than the fourth width W4 of the gap G1. Stated another way, the height HHP of the header panel 380 is equal to or less than the difference between the first width W1 of the center panel 320 and the sum of the second width W2 of the first side panel 330 and the third width W3 of the second side panel 340. In certain embodiments, the height HHP of the header panel 380 may be substantially equal to the fourth width W4 of the gap G1. As used herein, the term "substantially equal" allows for a tolerance of up to 5%. Thus, while being substantially equal, the height HHP of the header panel 380 may be up to 5% less than the fourth width W4 of the gap G1 (the height HHP of the header panel 380 should not be greater than the fourth width W4 of the gap G1). Additionally, the length LHP of the header panel 380 is approximately the same as the height HD of the multi-panel display device 310. The term "approximately the same" also allows for a tolerance of up to 5%.

Because the height HHP of the header panel 380 is substantially equal to the fourth width W4 of the gap G1, the header panel 380 can be positioned within the gap G1. Specifically, referring to FIG. 11, in the exemplified embodiment the header panel 380 is located in the gap G1 with the top edge 381 of the header panel 380 adjacent to the second edge 342 of the second side panel 340 and the bottom edge 382 of the header panel 380 adjacent to the second edge 332 of the first side panel 330. Of course, the header panel 380 could be positioned in the gap G1 with the top edge 381 of the header panel 380 adjacent to the second edge 332 of the first side panel 330 and the bottom edge 382 of the header panel 380 adjacent to the second edge 342 of the second side panel 330 in alternative embodiments.

In the exemplified embodiment, the header panel 380 is positioned within the gap G1 so as to cover the third portion 326 of the center panel 320 of the multi-panel display device 310. However, in the exemplified embodiment the header panel 380 is not in any way attached to the multi-panel display device 310 when the multi-panel display device 310 is in the folded state. Rather, the header panel 380 is merely positioned within the gap G1 without being attached to any portion of the multi-panel display device 310. In some embodiments, the top and bottom edges 381, 382 of the header panel 380 may come into frictional contact with the second edges 332, 342 of the first and second side panels 330, 340 when the header panel 380 is positioned within the gap G1. For example, if the height HHP of the header panel 380 is the same as the fourth width W4 of the gap G1, the header panel 380 will fit snugly within the gap G1 and such frictional contact will occur. In such embodiments, this frictional contact between edges of the header panel 380 and edges of the multi-panel display device 310 may assist in maintaining the header panel 380 in position within the gap G1. However, such frictional contact is not required in all embodiments.

Furthermore, in alternative embodiments the header panel 380 may be detachably coupled to one or both of the first and second side panels 330, 340. For example, the top edge 381 of the header panel 380 may be coupled to the second edge 342 of the second side panel 340 by a pre-weakened line and/or the bottom edge 382 of the header panel 380 may be coupled to the second edge 332 of the first side panel 330 by a pre-weakened line. In such embodiments, the pre-weakened line that attaches the header panel 380 to the first and/or second side panels 330, 340 may be a perforation line, a score line, or some other feature that facilitates tearing therealong to allow the header panel 380 to be separated from the multi-panel display device 310 without tearing either the header panel 380 or the multi-panel display device 310.

In the exemplified embodiment, the header panel 380 fits snugly within the gap G1. Thus, the sum of the height HHP of the header panel 380, the second width W2 of the first side panel 330, and the third width W3 of the second side panel 340 is substantially equal to the first width W1 of the center panel 310. When the multi-panel display device 310 is in the folded state and the header panel 380 is positioned within the gap G1, the first and second side panels 330, 340 and the header panel 380 collectively cover the entirety of the front surface 323 of the center panel 320. This is achieved because the height HHP of the header panel 380 is substantially the same as the fourth width W4 of the gap G1 and because the length LHP of the header panel 380 is substantially the same as the height HD of the multi-panel display device 310 (and each of the panels 320, 330, 340 thereof).

As illustrated in FIG. 11, in certain embodiments the multi-panel display kit 300 may be sold in a retail environment in a folded state whereby the multi-panel display device 310 is in the folded state and the header panel 380 is positioned within the gap G1. Furthermore, the multi-panel display kit 300 may be enclosed within a packaging 400. Thus, the packaging 400 may surround and fully enclose the multi-panel display kit 300 at the point of sale. For example, the packaging 400 may be a plastic material that is wrapped around the entirety of the multi-panel display kit 300 and closed so that the plastic material must be torn to remove the multi-panel display kit 300 therefrom. Such plastic material may be high-density polyethylene, low-density polyethylene, linear low-density polyethylene, or the like. Alternatively, the packaging 400 may be a cardboard box, a metal housing, or the like. Furthermore, in some embodiments the packaging 400 may be omitted and the multi-panel display kit 300 may be presented for sale without any particular packaging. However, packaging may be desirable in certain embodiments whereby the header 380 is not attached or otherwise affixed to the multi-panel display device 310 to make sure that those two components remain together in the kit up to the point of sale.

Figure 15:
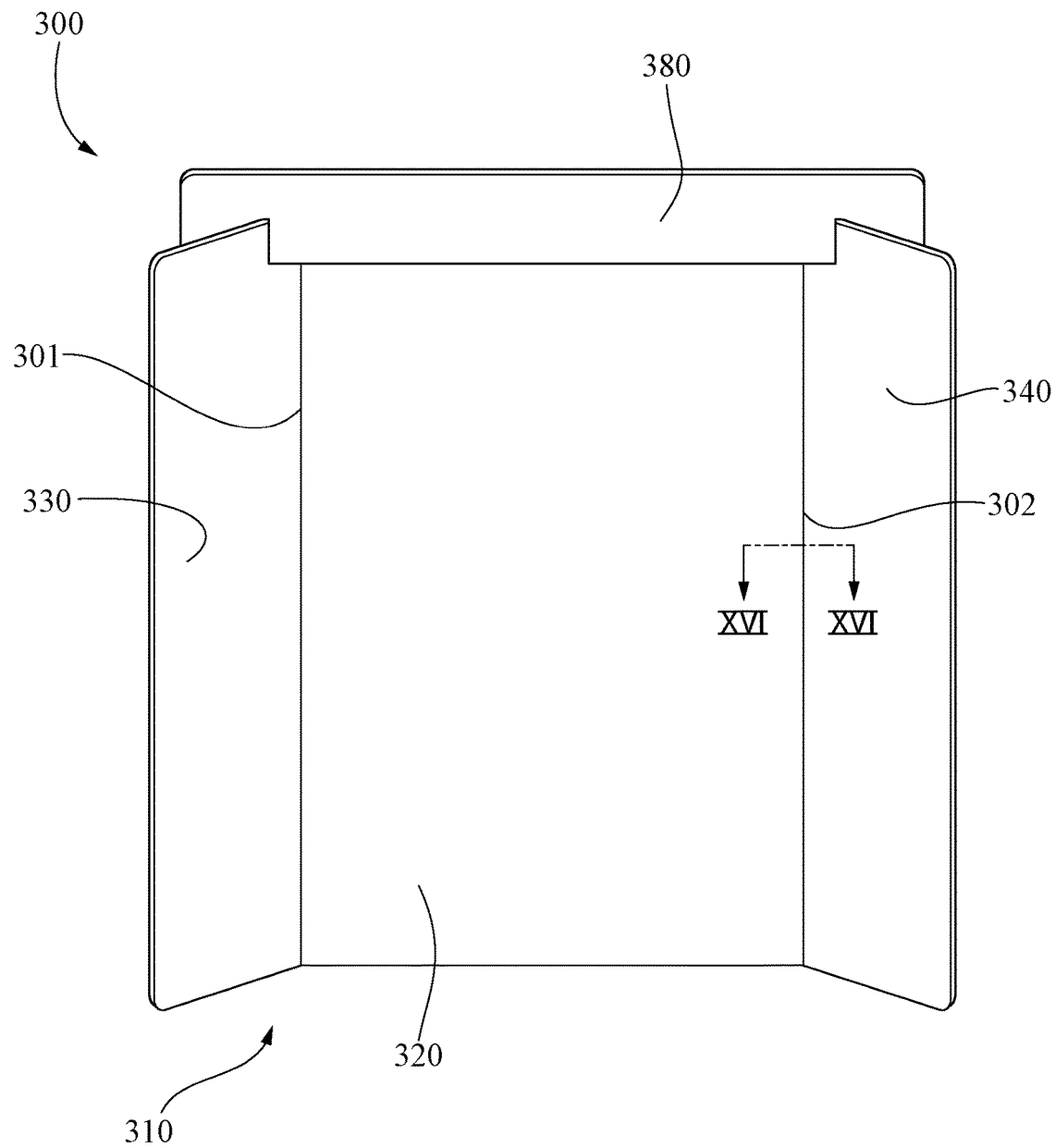
FIG. 15 is a front view of the multi-panel display kit of FIG. 11 in an assembled state.

When it is desired to use the multi-panel display kit 300, first the packaging 400 is torn or otherwise removed (if packaging is used). Next, the header panel 380 is removed from the gap G1 so that it is separate from the multi-panel display device 310 (see FIG. 12). Next, referring to FIG. 14, the first and second side panels 330, 340 of the multi-panel display device 310 are unfolded or rotated relative to the center panel 320 so that the first and second side panels 330, 340 do not overlap the center panel 320 at all. When unfolded, the first and second side panels 330, 340 should each extend from the center panel 320 at an oblique angle that is at least 90° and less than 180°, but preferably between 91° and 179°, and more specifically between 120° and 150°. Finally, referring to FIGS. 14 and 15, the header panel 380 is coupled to the multi-panel display device 310 by inserting portions of the first and second side panels 330, 340 into the slots 385, 386 of the header panel 380. Specifically, portions of the top edge 312 of the multi-panel display device 310 along the first and second side panels 330, 340 are inserted into the slots 385, 386 until they reach a fully inserted state as shown in FIG. 15. The attachment of the header panel 380 to the multi-panel display device 310 is identical to that which has been described above (see specifically FIGS. 4 and 5 and the related description) thus a more detailed description is not provided herein in the interest of brevity.

Referring to FIG. 16, a cross-sectional view of the multi-panel display device 310 is illustrated taken along line XVI-XVI of FIG. 15. The cross-sectional view provides a detailed illustration of the various layers of the multi-panel display device 310 and the manner in which the pre-weakened lines 301, 302 are formed. Although FIG. 16 is a cross-sectional view that includes the second pre-weakened line 302, the same structure occurs at the first pre-weakened line 301.

In the exemplified embodiment, the multi-panel display device 310 is formed of a foam board comprising a foam layer 360, a first paper layer 361, and a second paper layer 362. More specifically, the foam layer 360 comprises a first major surface 363 and a second major surface 364 opposite the first major surface 363. The first paper layer 361 covers the first major surface 363 of the foam layer 360 and the second paper layer 362 covers the second major surface 364 of the form layer 360. In alternative embodiments, the second paper layer 362 may be omitted and the multi-panel display device 310 may be formed from the foam layer 360 and the first paper layer 361 only. The first paper layer 361 forms the front surface of the multi-panel display device 310

(i.e., the front surfaces 323, 333, 343) and the second paper layer 362 forms the rear surface of the multi-panel display device 310. The header panel 380 may include similar layers to that which is described above with reference to the multi-panel display device 310, although this is not required in all embodiments and the header panel 380 may be formed of any of the other materials described herein even if the multi-panel display device 310 is formed of a foam board.

The foam layer 360 of the multi-panel display device 310 may be formed of polystyrene or any other foam material typical in products such as the one disclosed herein. In the exemplified embodiment, the foam layer 360 has a thickness measured between the first and second major surfaces 363, 364 of between 0.1" and 0.2", and more specifically approximately 0.15". Furthermore, the first and second paper layers 361, 362 may be any type of paper including having various thicknesses. In the exemplified embodiment, the first paper layer 361 has a thickness measured between the first major surface 363 of the foam layer and the front surface of the multi-panel display device 310 and the second paper layer 362 has a thickness measured between the second major surface 364 of the foam layer and the rear surface of the multi-panel display device 310. In some embodiments, the thicknesses of the first and second paper layers 361, 362 may be the same, although this is not required in all embodiments. The thicknesses of the first and second paper layers 361, 362 may be between 0.01" and 0.05", more specifically between 0.01" and 0.02", and still more specifically between 0.01" and 0.015". Of course, thicknesses outside of the noted ranges are also possible for both the foam layer 360 and the first and second paper layers 361, 362 in alternative embodiments.

In the exemplified embodiment, the second pre-weakened line 302 comprises a slit 370 that extends through the entire thickness of the second paper layer 362 and the foam layer 360 without penetrating the first paper layer 361. Thus, the slit 370 cuts entirely through the second paper layer 362 and the foam layer 360 without cutting into the first paper layer 361, thereby leaving the first paper layer 361 entirely intact. At the location of the second pre-weakened line 302, the first paper layer 361 is the only layer holding the multi-panel display device 310 together (and the same at the location of the first pre-weakened line 301). The slit 370 extends the entire height of the multi-panel display device 310 from the top edge 312 to the bottom edge 311. Thus, because the foam layer 360 (which is the bulk of the thickness of the multi-panel display device 310) and the second paper layer 361 are cut entirely through at the first and second pre-weakened lines 301, 302, the multi-panel display device 310 readily folds upon itself to transition between the folded and unfolded states at the location of the first and second pre-weakened lines 301, 302, as described herein above.

As used throughout, ranges are used as shorthand for describing each and every value that is within the range. Any value within the range can be selected as the terminus of the range. While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A multi-panel display kit comprising:
    a multi-panel display device comprising:
        a center panel extending from a first edge to a second edge, the center panel having a first width measured between the first and second edges of the center panel, the center panel being free of any pre-weakened lines;
        a first side panel extending from a first edge to a second edge, the first edge of the first side panel attached to the first edge of the center panel by a first pre-weakened line, the first side panel having a second width measured between the first and second edges of the first side panel;
        a second side panel extending from a first edge to a second edge, the first edge of the second side panel attached to the second edge of the center panel by a second pre-weakened line, the second side panel having a third width measured between the first and second edges of the second side panel; and
        wherein the first width is greater than a sum of the second and third widths;
    wherein the multi-panel display device is alterable between: (1) a folded state in which the first and second side panels are folded about the first and second pre-weakened lines, respectively, so that the first and second side panels overlap the center panel with front surfaces of the first and second side panels facing a front surface of the center panel; and (2) an unfolded state in which the first and second side panels do not overlap the center panel;
    wherein in the folded state a gap exists between the second edge of the first side panel and the second edge of the second side panel so that a portion of the center panel is not covered by the first and second side panels; and
    wherein a header panel is positioned within the gap and covers the portion of the center panel that is not covered by the first and second side panels.

2. The multi-panel display kit according to claim 1 wherein the second edges of the first and second side panels form free edges of the multi-panel display device.

3. The multi-panel display kit according to claim 1 wherein the header panel is separate from and not attached to the multi-panel display device when the multi-panel display device is in the folded state and the header panel is positioned within the gap.

4. The multi-panel display kit according to claim 3 wherein the gap has a fourth width that is between 10% and 30% of the first width.

5. The multi-panel display kit according to claim 1, further comprising the header panel having a top edge that is adjacent to the second edge of one of the first and second side panels and a bottom edge that is adjacent to the second edge of the other one of the first and second side panels.

6. The multi-panel display kit according to claim 5 wherein the header panel comprises a height measured between the top and bottom edges, the height of the header panel being equal to or less than the fourth width of the gap.

7. The multi-panel display kit according to claim 5 wherein the header panel comprises a pair of slots extending from the bottom edge towards the top edge in a spaced apart manner, the pair of slots configured to receive a portion of a top edge of the multi-panel display device to couple the header panel to the multi-panel display device.

8. The multi-panel display kit according to claim 1 further comprising the header panel having a top edge, a bottom edge, and a height measured between the top and bottom edges, and wherein the height of the header panel is equal to or less than the first width minus the sum of the second and third widths.

9. The multi-panel display kit according to claim 8 wherein a sum of the height of the header panel, the second width of the first side panel, and the third width of the second side panel is substantially equal to the first width of the center panel.

10. The multi-panel display kit according to claim 8 further comprising packaging that encloses the multi-panel display device and the header panel.

11. The multi-panel display kit according to claim 8 wherein the multi-panel display device extends from a bottom edge to a top edge and has a height measured therebetween, and wherein the header panel extends from a first side edge to a second side edge and has a length measured therebetween, and wherein the length of the header panel and the height of the multi-panel display device are substantially the same.

12. The multi-panel display kit according to claim 1 wherein a ratio of the first width to each of the second and third widths is between 2.2:1 and 2.8:1.

13. The multi-panel display kit according to claim 1 wherein the second and third widths are the same.

14. The multi-panel display kit according to claim 1 wherein the first side panel, the second side panel, and the center panel collectively form a first integral sheet of material and wherein the header panel forms a second integral sheet of material that is distinct from the first integral sheet of material.

15. A multi-panel display kit comprising:
a multi-panel display device extending from a bottom edge to a top edge and comprising:
a center panel extending from a first edge to a second edge;
a first side panel extending from a first edge to a second edge, the first edge of the first side panel attached to the first edge of the center panel by a first pre-weakened line; and
a second side panel extending from a first edge to a second edge, the first edge of the second side panel attached to the second edge of the center panel by a second pre-weakened line;
wherein the multi-panel display device is folded about the first and second pre-weakened lines so that the first side panel covers a first portion of the center panel and the second side panel covers a second portion of the center panel, a third portion of the center panel located between the first and second portions of the center panel being exposed;
a header panel covering the third portion of the center panel without overlapping the first and second side panels; and
wherein the header panel comprises a bottom edge that is adjacent to the second edge of the first side panel, a top edge that is adjacent to the second edge of the second side panel, and a pair of slots extending from the bottom edge towards the top edge in a spaced apart manner, the pair of slots configured to receive a portion of the top edge of the multi-panel display device to couple the header panel to the multi-panel display device.

16. The multi-panel display kit according to claim 15 wherein the center panel has a width measured between the first and second edges of the center panel and the header panel has a height measured between the top and bottom edges of the header panel that is between 10% and 30% of the width of the center panel.

17. The multi-panel display kit according to claim 15 further comprising the center panel having a first width measured between the first and second edges of the center panel, the first side panel having a second width measured between the first and second edges of the first side panel, the second side panel having a third width measured between the first and second edges of the second side panel, and the header panel having a height measured between the bottom and top edges of the header panel, and wherein the first width of the center panel is substantially equal to the sum of the second width of the first side panel, the third width of the second side panel, and the height of the header panel.

18. The multi-panel display kit according to claim 15 wherein the header panel is not attached to the multi-panel display device.

* * * * *